US012603275B2

(12) United States Patent
Mendez Agudelo et al.

(10) Patent No.: US 12,603,275 B2
(45) **Date of Patent: *Apr. 14, 2026**

(54) ELECTROCHEMICAL CELLS COMPRISING COATED CATHODE ACTIVE MATERIAL AND SILYL ESTER PHOSPHONATE AS ELECTROLYTE ADDITIVE

(71) Applicant: BASF SE, Ludwigshafen am Rhein (DE)

(72) Inventors: Manuel Alejandro Mendez Agudelo, Ludwigshafen (DE); Maraike Ahlf, Ludwigshafen (DE); Heino Sommer, Ludwigshafen (DE); Jacob Haag, Beachwood, OH (US); Hannes Wolf, Ludwigshafen (DE); Johannes David Hoecker, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 339 days.

This patent is subject to a terminal disclaimer.

(21) Appl. No.: 16/970,775

(22) PCT Filed: Mar. 8, 2019

(86) PCT No.: PCT/EP2019/055800

§ 371 (c)(1),
(2) Date: Aug. 18, 2020

(87) PCT Pub. No.: WO2019/175035

PCT Pub. Date: Sep. 19, 2019

(65) Prior Publication Data

US 2021/0098782 A1 Apr. 1, 2021

(30) Foreign Application Priority Data

Mar. 14, 2018 (EP) .................................... 18161650

(51) Int. Cl.
*H01M 4/36* (2006.01)
*H01M 4/131* (2010.01)
(Continued)

(52) U.S. Cl.
CPC ........... *H01M 4/366* (2013.01); *H01M 4/131* (2013.01); *H01M 4/136* (2013.01); *H01M 4/505* (2013.01); *H01M 4/525* (2013.01); *H01M 4/5825* (2013.01); *H01M 4/62* (2013.01); *H01M 10/0525* (2013.01); *H01M 10/0567* (2013.01); *H01M 10/0569* (2013.01); *H01M 2004/028* (2013.01); *H01M 4/133* (2013.01); *H01M 4/134* (2013.01); *H01M 10/0568* (2013.01);
(Continued)

(58) Field of Classification Search
CPC ......... H01M 10/0567; H01M 10/0569; H01M 10/0525; H01M 2300/0028; H01M 2300/0034; H01M 4/525; H01M 4/505; H01M 4/5825; H01M 4/62; H01M 4/587; H01M 4/386; H01M 4/364; H01M 4/366; H01M 2004/028; H01M 10/0568; H01M 4/131; H01M 4/136; H01M 4/133; H01M 4/134
See application file for complete search history.

(56) References Cited

U.S. PATENT DOCUMENTS 8,734,668 B2 5/2014 Bhat et al.
8,993,051 B2 3/2015 Kelder et al.
(Continued)

FOREIGN PATENT DOCUMENTS

CN 106866728 A 6/2017
EP 2 573 854 * 3/2013
(Continued)

OTHER PUBLICATIONS

International Search Report issued May 8, 2019 in PCT/EP2019/055800, 4 pages.

(Continued)

*Primary Examiner* — Laura Weiner
(74) *Attorney, Agent, or Firm* — Peter DiMauro

(57) ABSTRACT

An electrochemical cell has a cathode active material selected from mixed lithium transition metal oxides containing Mn and at least one second transition metal; lithium intercalating mixed oxides containing Ni, Al and at least one second transition metal; and lithium metal phosphates, wherein the outer surface of the particulate cathode active material is at least partially coated with an oxide selected from transition metal oxides, lanthanide oxides, and oxides of metals and half metals of groups 2, 13, and 14 of the periodic system; and an electrolyte composition containing at least one silyl ester phosphonate of formula (I)

(I)

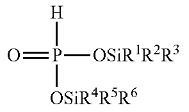

and at least one silyl ester phosphonate of formula (II)

(II)

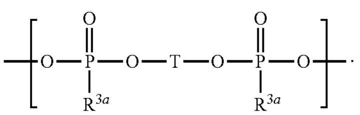

18 Claims, No Drawings

(51) Int. Cl.

| | |
|---|---|
| ***H01M 4/136*** | (2010.01) |
| ***H01M 4/505*** | (2010.01) |
| ***H01M 4/525*** | (2010.01) |
| ***H01M 4/58*** | (2010.01) |
| ***H01M 4/62*** | (2006.01) |
| ***H01M 10/0525*** | (2010.01) |
| ***H01M 10/0567*** | (2010.01) |
| ***H01M 10/0569*** | (2010.01) |
| *H01M 4/02* | (2006.01) |
| *H01M 4/133* | (2010.01) |
| *H01M 4/134* | (2010.01) |
| *H01M 10/0568* | (2010.01) |

(52) U.S. Cl.

CPC ............... *H01M 2300/0028* (2013.01); *H01M 2300/0034* (2013.01)

(56) References Cited

U.S. PATENT DOCUMENTS

| | | | | |
|---|---|---|---|---|
| 8,993,158 | B2 * | 3/2015 | Kobayashi ........ | H01M 10/0567 252/62.2 |
| 11,404,723 | B2 * | 8/2022 | Hoecker ........... | H01M 10/0567 |
| 11,936,002 | B2 * | 3/2024 | Mendez Agudelo ........................ | H01M 10/0567 |
| 2009/0136854 | A1 | 5/2009 | Nakura | |
| 2009/0155590 | A1 | 6/2009 | Kelder et al. | |
| 2013/0071732 | A1 | 3/2013 | Kobayashi et al. | |
| 2013/0164604 | A1 | 6/2013 | Matsumoto et al. | |
| 2015/0162606 | A1 | 6/2015 | Kelder et al. | |
| 2016/0226057 | A1 | 8/2016 | Kelder et al. | |
| 2016/0254546 | A1 | 9/2016 | Kwak et al. | |
| 2017/0282140 | A1 | 10/2017 | Kelder et al. | |
| 2019/0252722 | A1 | 8/2019 | Mendez Agudelo | |

FOREIGN PATENT DOCUMENTS

| | | | | |
|---|---|---|---|---|
| JP | 2007-18874 | | | 1/2007 |
| JP | 2015092476 | A | | 5/2015 |
| JP | 2015092477 | A | | 5/2015 |
| JP | 2017097995 | A | | 6/2017 |
| KR | 2013-0029397 | | | 3/2013 |
| KR | 2016-0031427 | | | 3/2016 |
| KR | 2017-0000903 | | * | 1/2017 |
| WO | WO 2011/145623 | | * | 11/2011 |
| WO | WO 2013/026854 | A1 | | 2/2013 |
| WO | WO 2019/115541 | A1 | | 6/2019 |

OTHER PUBLICATIONS

Extended European Search Report issued Aug. 17, 2018 in European Patent Application No. 18161650.9, 3 pages.

Elazari, R., et al., "Rechargeable lithiated silicon-sulfur (SLS) battery prototypes", Electrochemistry Communications, vol. 14, issue 1, Jan. 2012, pp. 21-24.

Kellner, K., et al., "Zur Reaktion von Chlorsilanen mit Dialkylphosphonaten", Monatshefte ffir Chemie. Retrieved from the internet: URL: https://link.springer.com/content/pdf/10.1007/BF00803253.pdf , Monatshefte für Chemie / Chemical Monthly, vol. 121, Issue 12, Dec. 1990, XP055478607, pp. 1031-1038.

Sekine, M., et al., "Silyl Phosphites. 15. Reactions of Silyl Phosphites with α-Halo Carbonyl Compounds. Elucidation of the Mechanism of the Perkow Reaction and Related Reactions with Confirmed Experiments", J. Org. Chem., May 1, 1981, vol. 46, No. 10, XP055497861, pp. 2097-2107.

* cited by examiner

ELECTROCHEMICAL CELLS COMPRISING COATED CATHODE ACTIVE MATERIAL AND SILYL ESTER PHOSPHONATE AS ELECTROLYTE ADDITIVE

The present invention relates to an electrochemical cell comprising a cathode active material selected from mixed lithium transition metal oxides containing Mn and at least one second transition metal; lithium intercalating mixed oxides containing Ni, Al and at least one second transition metal; and lithium metal phosphates, wherein the outer surface of said particulate cathode active material is at least partially coated with an oxide selected from transition metal oxides, lanthanide oxides, and oxides of metals and half metals of groups 2, 13, and 14 of the periodic system; and an electrolyte composition containing at least one silyl ester phosphonate selected from compounds of formula (I)

(I)

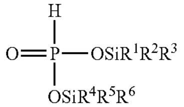

and silyl ester phosphonate compounds containing the structure of formula (II)

(II)

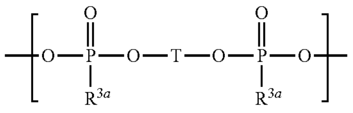

wherein $R^1$ to $R^6$, $R^{3a}$, and T are defined as below.

Storing electrical energy is a subject of still growing interest. Efficient storage of electric energy allows electric energy to be generated when it is advantageous and to be used when needed. Secondary electrochemical cells are well suited for this purpose due to their reversible conversion of chemical energy into electrical energy and vice versa (rechargeability). Secondary lithium batteries are of special interest for energy storage since they provide high energy density and specific energy due to the small atomic weight of the lithium ion, and the high cell voltages that can be obtained (typically 3 to 5 V) in comparison with other battery systems. For that reason, these systems have become widely used as a power source for many portable electronics such as cellular phones, laptop computers, mini-cameras, etc.

In secondary lithium batteries like lithium ion batteries organic carbonates, ethers, esters and ionic liquids are used as sufficiently polar solvents for solvating the conducting salt(s). Most state of the art lithium ion batteries in general comprise not a single solvent but a solvent mixture of different organic aprotic solvents.

One problem occurring in lithium ion batteries is attributed to undesired reactions on the surface of the electrode active materials which lead to a deterioration of their electrochemical properties during the lifetime of the batteries, e.g. an increase of the cell resistance, increased gas generation, and reduced capacity. Such reactions may be a decomposition of compounds present in the electrolyte composition, e.g. the solvent or conducting salt.

Therefore, an electrolyte composition usually contains further additives to improve certain properties of the electrolyte composition and of the electrochemical cell comprising said electrolyte composition. Common additives are for example flame retardants, water and side-product scavengers, overcharge protection additives and film forming additives which react during first charge/discharge cycle on the electrode surface thereby forming a film on the electrode to reduce direct contact between the electrolyte composition and the electrode active material.

U.S. Pat. No. 8,734,668 B2 describes electrolyte compositions comprising silicon containing compounds which may additionally contain hetero atoms like B, Al, P, S, F, Cl, Br, and I.

U.S. Pat. No. 8,993,158 B2 discloses electrolyte compositions for use in lithium ion batteries comprising silyl ester group-containing phosphonic acid derivatives to inhibit increase of the battery resistance and deterioration of the battery performance in a high-temperature environment.

US 2013/0164604 A1 refers to the use of phosphite esters, phosphonate esters and bisphosphonate esters as additives in electrolyte compositions for lithium ion batteries.

Another approach to improve the electrochemical properties of a lithium ion battery during its lifetime is the protection the surface of the cathode without hindering the lithium exchange during charging and discharging by coating the cathode active materials with, e.g., aluminium oxide or tin oxide, see, e.g., U.S. Pat. No. 8,993,051.

Nevertheless, there is further need of improvement of the electrochemical properties of electrochemical cells during cycling and storage, both at room temperature and elevated temperatures, in particular in regard to capacity retention, cell resistance, rate capability, and gas generation.

It was therefore an objective of the present invention to provide electrochemical cells having improved electrochemical properties during cycling and storage, both at room temperature and elevated temperatures, like improved capacity retention, less increase of cell resistance and less gas generation.

Accordingly, an electrochemical cell is provided, comprising (A) an anode comprising at least one anode active material, (B) a cathode comprising at least one particulate cathode active material selected from mixed lithium transition metal oxides containing Mn and at least one second transition metal; lithium intercalating mixed oxides containing Ni, Al and at least one second transition metal; and lithium metal phosphates, wherein the outer surface of said particulate cathode active material is at least partially coated with an oxide selected from transition metal oxides, lanthanide oxides, and oxides of metals and half metals of groups 2, 13, and 14 of the periodic system;

(C) an electrolyte composition containing
- (i) at least one aprotic organic solvent;
- (ii) at least one lithium ion containing conducting salt;
- (iii) at least one silyl ester phosphonate selected from compounds of formula (I) and silyl ester phosphonate compounds containing the structure of formula (II)

(I)

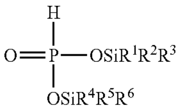

wherein $R^1$, $R^2$, $R^3$, $R^4$, $R^5$, and $R^6$ are independently from each other selected from H, F, $R^7$, $OR^7$, and $OSi(R^8)_3$;

$R^7$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more substituents selected from $OSi(CH_3)_3$ and F; and $R^8$ is independently at each occurrence selected from H, F, $R^7$ and $OR^7$; or wherein $R^1$ and $R^4$ are combined and jointly selected from O, $CR^9R^{10}$, and $NR^{11}$ and form a 6-membered cycle with the Si—O—P—O—Si group;

$R^9$ and $R^{10}$ are selected independently from each other from H, F, $R^7$, $OR^7$, and $OSiR^8{}_3$;

$R^{11}$ is selected from H and $R^7$; and $R^2$, $R^3$, $R^5$, $R^7$, and $R^8$ are independently from each other selected as defined above;

(II)

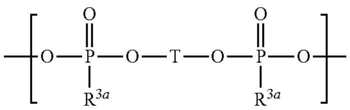

wherein

T is selected from

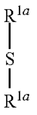

and

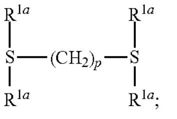

p is an integer from 0 to 6 and one or more $CH_2$ groups of $(CH_2)p$ may be replaced by O and one or more H of $(CH_2)p$ may be replaced by $C_1$-$C_4$ alkyl;

$R^{1a}$ is selected independently at each occurrence from H, F, Cl, $R^{4a}$, $OR^{4a}$, $OSi(R^{5a})_3$, $OSi(OR^{4a})_3$, and $OP(O)(OR^{4a})R^{5a}$;

$R^{4a}$ is independently at each occurrence selected from $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero) aryl, and $C_6$-$C_{13}$ (hetero)aralkyl which may be substituted by one or more substituents selected from CN and F and wherein one or more $CH_2$-groups of alkyl, alkenyl and alkynyl which are not directly bound to the Si-atom or the O-atom may be replaced by O;

$R^{3a}$ and $R^{5a}$ are selected independently at each occurrence from H, F, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl which may be substituted by one or more substituents selected from CN and F and wherein one or more $CH_2$-groups of alkyl, alkenyl and alkynyl which are not directly bound to the P-atom may be replaced by O; and (iv) optionally one or more additives.

Surprisingly, the addition of the silyl ester phosphonates to the electrolyte composition used in combination with the at least partially coated cathode active material yields electrochemical cells showing good capacity retention and an unexpected low increase of the cell resistance during cycling at elevated temperatures.

In the following the invention is described in detail.

The inventive electrochemical cell comprises an electrolyte composition (C). Viewed chemically, an electrolyte composition is any composition that comprises free ions and as a result is electrically conductive. The electrolyte composition functions as a medium that transfers ions participating in the electrochemical reactions taking place in an electrochemical cell. In case of a lithium battery the ion participating in the electrochemical reaction is usually the lithium ion. The most common electrolyte composition is an ionic solution, although molten electrolyte compositions and solid electrolyte compositions are likewise possible. An electrolyte composition of the invention is therefore an electrically conductive medium, primarily due to the presence of at least one substance which is present in a dissolved and/or molten state, i.e., an electrical conductivity supported by movement of ionic species. In liquid or gel electrolyte compositions the conducting salt is usually solvated in one or more aprotic organic solvents.

The electrolyte composition contains at least one aprotic organic solvent (i). The at least one aprotic organic solvent may be selected from optionally fluorinated aprotic organic solvents, i.e. from fluorinated and non-fluorinated aprotic organic solvents. The electrolyte composition may contain a mixture of fluorinated and non-fluorinated aprotic organic solvents.

The aprotic organic solvent is preferably selected from optionally fluorinated cyclic and acyclic organic carbonates, optionally fluorinated acyclic ethers and polyethers, optionally fluorinated cyclic ethers, optionally fluorinated cyclic and acyclic acetales and ketales, optionally fluorinated orthocarboxylic acids esters, optionally fluorinated cyclic and acyclic esters and diesters of carboxylic acids, optionally fluorinated cyclic and acyclic sulfones, optionally fluorinated cyclic and acyclic nitriles and dinitriles and optionally fluorinated cyclic and acyclic phosphates and mixtures thereof.

Examples of optionally fluorinated cyclic carbonates are ethylene carbonate (EC), propylene carbonate (PC) and butylene carbonate (BC), wherein one or more H may be substituted by F and/or an $C_1$ to $C_4$ alkyl group, e.g. 4-methyl ethylene carbonate, monofluoroethylene carbonate (FEC), and cis- and trans-difluoroethylene carbonate. Preferred optionally fluorinated cyclic carbonates are ethylene carbonate, monofluoroethylene carbonate, and propylene carbonate, in particular ethylene carbonate.

Examples of optionally fluorinated acyclic carbonates are di-$C_1$-$C_{10}$-alkylcarbonates, wherein each alkyl group is selected independently from each other and wherein one or more H may be substituted by F. Preferred are optionally fluorinated di-$C_1$-$C_4$-alkylcarbonates. Examples are e.g. diethyl carbonate (DEC), ethyl methyl carbonate (EMC), 2,2,2-trifluoroethyl methyl carbonate (TFEMC), dimethyl carbonate (DMC), trifluoromethyl methyl carbonate (TFMMC), and methylpropyl carbonate. Preferred acyclic carbonates are diethyl carbonate (DEC), ethyl methyl carbonate (EMC), and dimethyl carbonate (DMC).

In one embodiment of the invention the electrolyte composition contains mixtures of optionally fluorinated acyclic organic carbonates and cyclic organic carbonates at a ratio by weight of from 1:10 to 10:1, preferred of from 3:1 to 1:1.

Examples of optionally fluorinated acyclic ethers and polyethers are optionally fluorinated di-$C_1$-$C_{10}$-alkylethers, optionally fluorinated di-$C_1$-$C_4$-alkyl-$C_2$-$C_6$-alkylene ethers, optionally fluorinated polyethers, and fluorinated ethers of formula R'—(O—$CF_pH_{2-p})_q$—R" wherein R' is a $C_1$-$C_{10}$ alkyl group or a $C_3$-$C_{10}$ cycloalkyl group, wherein one or more H of an alkyl and/or cycloalkyl group are substituted by F; R" is H, F, a $C_1$-$C_{10}$ alkyl group, or a $C_3$-$C_{10}$ cycloalkyl group, wherein one or more H of an alkyl and/or cycloalkyl group are substituted by F; p is 1 or 2; and q is 1, 2 or 3.

According to the invention each alkyl group of the optionally fluorinated di-$C_1$-$C_{10}$-alkylethers is selected independently from the other wherein one or more H of an alkyl group may be substituted by F. Examples of optionally fluorinated di-$C_1$-$C_{10}$-alkylethers are dimethylether, ethylmethylether, diethylether, methylpropylether, diisopropylether, di-n-butylether, 1,1,2,2-tetrafluoroethyl-2,2,3,3-tetrafluoropropyl ether ($CF_2HCF_2CH_2OCF_2CF_2H$), and 1H,1H,5H-perfluoropentyl-1,1,2,2-tetrafluoroethylether ($CF_2H(CF_2)_3CH_2OCF_2CF_2H$).

Examples of optionally fluorinated di-$C_1$-$C_4$-alkyl-$C_2$-$C_6$-alkylene ethers are 1,2-dimethoxyethane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether.

Examples of suitable optionally fluorinated polyethers are polyalkylene glycols wherein one or more H of an alkyl or alkylene group may be substituted by F, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end-capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of fluorinated ethers of formula R'—(O—$CF_pH_{2-p})_q$—R" are 1,1,2,2-tetrafluoroethyl-2,2,3,3-tetrafluoropropyl ether ($CF_2HCF_2CH_2OCF_2CF_2H$), and 1H,1H,5H-perfluoropentyl-1,1,2,2-tetrafluoroethylether ($CF_2H(CF_2)_3CH_2OCF_2CF_2H$).

Examples of optionally fluorinated cyclic ethers are 1,4-dioxane, tetrahydrofuran, and their derivatives like 2-methyl tetrahydrofuran wherein one or more H of an alkyl group may be substituted by F.

Examples of optionally fluorinated acyclic acetals are 1,1-dimethoxymethane and 1,1-diethoxymethane. Examples of cyclic acetals are 1,3-dioxane, 1,3-dioxolane, and their derivatives such as methyl dioxolane wherein one or more H may be substituted by F.

Examples of optionally fluorinated acyclic orthocarboxylic acid esters are tri-$C_1$-$C_4$ alkoxy methane, in particular trimethoxymethane and triethoxymethane. Examples of suitable cyclic orthocarboxylic acid esters are 1,4-dimethyl-3,5,8-trioxabicyclo[2.2.2]octane and 4-ethyl-1-methyl-3,5,8-trioxabicyclo[2.2.2]octane wherein one or more H may be substituted by F.

Examples of optionally fluorinated acyclic esters of carboxylic acids are ethyl and methyl formiate, ethyl and methyl acetate, ethyl and methyl proprionate, and ethyl and methyl butanoate, and esters of dicarboxylic acids like 1,3-dimethyl propanedioate wherein one or more H may be substituted by F. An example of a cyclic ester of carboxylic acids (lactones) is γ-butyrolactone.

Examples of optionally fluorinated cyclic and acyclic sulfones are ethyl methyl sulfone, dimethyl sulfone, and tetrahydrothiophene-S,S-dioxide (sulfolane).

Examples of optionally fluorinated cyclic and acyclic nitriles and dinitriles are adipodinitrile, acetonitrile, propionitrile, and butyronitrile wherein one or more H may be substituted by F.

Examples of optionally fluorinated cyclic and acyclic phosphates are trialkyl phosphates wherein one or more H of an alkyl group may be substituted by F like trimethyl phosphate, triethyl phosphate, and tris(2,2,2-trifluoroethyl) phosphate.

More preferred the aprotic organic solvent(s) are selected from optionally fluorinated ethers and polyethers, optionally fluorinated cyclic and acyclic organic carbonates, optionally fluorinated cyclic and acyclic esters and diesters of carboxylic acids and mixtures thereof. Even more preferred the aprotic organic solvent(s) are selected from optionally fluorinated ethers and polyethers, and optionally fluorinated cyclic and acyclic organic carbonates, and mixtures thereof.

According to one embodiment the electrolyte composition contains at least solvent selected from fluorinated ethers and polyethers, e.g. compounds of formula fluorinated ethers of formula R'—(O—$CF_pH_{2-p})_q$—R" as defined above like $CF_2HCF_2CH_2OCF_2CF_2H$ or $CF_2H(CF_2)_3CH_2OCF_2CF_2H$.

According to another embodiment, the electrolyte composition contains at least one solvent selected from fluorinated cyclic carbonate like 1-fluoro ethyl carbonate.

According to a further embodiment the electrolyte composition contains at least one solvent selected from fluorinated cyclic carbonate, e.g. 1-fluoro ethyl carbonate, and at least one solvent selected from fluorinated ethers and polyethers, e.g. compounds of formula fluorinated ethers of formula R'—(O—$CF_rH_{2-r})_s$—R" as defined above like $CF_2HCF_2CH_2OCF_2CF_2H$ or $CF_2H(CF_2)_3CH_2OCF_2CF_2H$.

According to another embodiment the electrolyte composition contains at least one fluorinated cyclic carbonate, e.g. 1-fluoro ethyl carbonate and at least one non-fluorinated acyclic organic carbonate, e.g. dimethyl carbonate, diethyl carbonate or ethyl methyl carbonate.

The electrolyte composition (C) contains at least one lithium ion containing conducting salt (ii). The electrolyte composition functions as a medium that transfers ions participating in the electrochemical reaction taking place in an electrochemical cell. The lithium ion containing conducting salt(s) (ii) present in the electrolyte composition are usually solvated in the aprotic organic solvent(s) (i). Examples of lithium ion containing conducting salts are

- $Li[F_{6-x}P(C_yF_{2y+1})_x]$, wherein x is an integer in the range from 0 to 6 and y is an integer in the range from 1 to 20;
- $Li[B(R^I)_4]$, $Li[B(R^I)_2(OR^{II}O)]$ and $Li[B(OR^{II}O)_2]$ wherein each $R^I$ is independently from each other selected from F, Cl, Br, I, $C_1$-$C_4$ alkyl, $C_2$-$C_4$ alkenyl, $C_2$-$C_4$ alkynyl, $OC_1$-$C_4$ alkyl, $OC_2$-$C_4$ alkenyl, and $OC_2$-$C_4$ alkynyl wherein alkyl, alkenyl, and alkynyl may be substituted by one or more $OR^{III}$, wherein $R^{III}$ is selected from $C_1$-$C_6$ alkyl, $C_2$-$C_6$ alkenyl, and $C_2$-$C_6$ alkynyl, and $(OR^{II}O)$ is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

$LiClO_4$; $LiAsF_6$; $LiCF_3SO_3$; $Li_2SiF_6$; $LiSbF_6$; $LiAlCl_4$, $Li(N(SO_2F)_2)$, lithium tetrafluoro (oxalato) phosphate; lithium oxalate; and salts of the general formula $Li[Z(C_nF_{2n+1}SO_2)_m]$, where m and n are defined as follows:

m=1 when Z is selected from oxygen and sulfur, m=2 when Z is selected from nitrogen and phosphorus, m=3 when Z is selected from carbon and silicon, and n is an integer in the range from 1 to 20.

Suited 1,2- and 1,3-diols from which the bivalent group $(OR^{II}O)$ is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated $C_1$-$C_4$ alkyl group. An example for such 1,2- or 1,3-diole is 1,1,2,2-tetra(trifluoromethyl)-1,2-ethane diol.

"Fully fluorinated $C_1$-$C_4$ alkyl group" means, that all H-atoms of the alkyl group are substituted by F.

Suited 1,2- or 1,3-dicarboxlic acids from which the bivalent group $(OR^{II}O)$ is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acid are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group $(OR^{II}O)$ is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of $Li[B(R^I)_4]$, $Li[B(R^I)_2(OR^{II}O)]$ and $Li[B(OR^{II}O)_2]$ are $LiBF_4$, lithium difluoro oxalato borate and lithium dioxalato borate.

Preferably the at least one lithium ion containing conducting salt is selected from $LiPF_6$, $LiAsF_6$, $LiSbF_6$, $LiCF_3SO_3$, $LiBF_4$, lithium bis(oxalato) borate, $LiClO_4$, $LiN(SO_2C_2F_5)_2$, $LiN(SO_2CF_3)_2$, $LiN(SO_2F)_2$, and $LiPF_3(CF_2CF_3)_3$, more preferred the conducting salt is selected from $LiPF_6$, $LiN(SO_2F)_2$, and $LiBF_4$, and the most preferred conducting salt is $LiPF_6$.

The lithium conducting salt(s) are usually present at a minimum concentration of at least 0.1 mol/l, preferably the concentration of the ion containing conducting salt(s) is 0.5 to 2 mol/l based on the entire electrolyte composition.

The electrolyte composition (C) contains at least silyl ester phosphonate selected from compounds of formula (I) and silyl ester phosphonate compounds containing the structure of formula (II) as defined above and described in detail below. The silyl ester phosphonates are also referred to as component (iii) of the electrolyte composition (C).

The term "$C_1$-$C_6$ alkyl" as used herein means a straight or branched saturated hydrocarbon group with 1 to 6 carbon atoms having one free valence, e.g., methyl, ethyl, n-propyl, isopropyl, n-butyl, isobutyl, tert-butyl, n-pentyl, iso-pentyl, 2,2-dimethylpropyl, n-hexyl, and the like. Preferred are $C_1$-$C_4$ alkyl, more preferred are methyl, ethyl, and n- and iso-propyl and most preferred is methyl.

The term "$C_2$-$C_6$ alkenyl" as used herein refers to an unsaturated straight or branched hydrocarbon group with 2 to 6 carbon atoms having one free valence. Unsaturated means that the alkenyl group contains at least one C—C double bond. $C_2$-$C_6$ alkenyl includes for example ethenyl, 1-propenyl, 2-propenyl, 1-n-butenyl, 2-n-butenyl, iso-butenyl, 1-pentenyl, 1-hexenyl, and the like. Preferred are $C_2$-$C_4$alkenyl groups, more preferred are ethenyl and propenyl, most preferred is 1-propen-3-yl, also called allyl.

The term "$C_2$ to $C_6$ alkynyl" as used herein refers to an unsaturated straight or branched hydrocarbon group with 2 to 6 carbon atoms having one free valence, wherein the hydrocarbon group contains at least one C—C triple bond. $C_2$-$C_6$ alkynyl includes for example ethynyl, propynyl, 1-n-butinyl, 2-n-butynyl, iso-butinyl, 1-pentynyl, 1-hexynyl, and the like. Preferred are $C_2$-$C_4$ alkynyl, more preferred are ethynyl and 1-propyn-3-yl(propargyl).

The term "$C_5$ to $C_7$ (hetero)aryl" as used herein denotes an aromatic 5- to 7-membered hydrocarbon cycle or condensed cycles having one free valence wherein one or more of the C— atoms of the aromatic cycle(s) may be replaced independently from each other by a heteroatom selected from N, S, O and P. Examples of $C_6$-$C_7$ (hetero)aryl are pyrrolyl, furanyl, thiophenyl, pyridinyl, pyranyl, thiopyranyl, and phenyl. Preferred is phenyl.

The term "$C_6$-$C_{13}$ (hetero)aralkyl" as used herein denotes an aromatic 5- to 7-membered hydrocarbon cycle substituted by one or more $C_1$-$C_6$ alkyl wherein one or more of the C-atoms of the aromatic cycle may be replaced independently from each other by a heteroatom selected from N, S, O and P. The $C_6$-$C_{13}$ (hetero)aralkyl group contains in total 6 to 13 C— and heteroatoms and has one free valence. The free valence may be located in the aromatic cycle or in a $C_1$-$C_6$ alkyl group, i.e. $C_6$-$C_{13}$ (hetero)aralkyl group may be bound via the (hetero)aromatic part or via the alkyl part of the group. Examples of $C_6$-$C_{13}$ (hetero)aralkyl are methylphenyl, 2-methylpyridyl, 1,2-dimethylphenyl, 1,3-dimethylphenyl, 1,4-dimethylphenyl, ethylphenyl, 2-propylphenyl, benzyl, 2-$CH_2$-pyridyl, and the like.

$R^1$, $R^2$, $R^3$, $R^4$, $R^5$, and $R^6$ are independently from each other selected from H, F, $R^7$, $OR^7$, and $OSi(R^8)_3$ wherein it is possible that $R^1$ and $R^4$ are combined and jointly selected from O, $CR^9R^{10}$, and $NR^{11}$ and form a 6-membered cycle with the Si—O—P—O—Si group of the compound of formula (I), preferably $R^1$, $R^2$, $R^3$, $R^4$, $R^5$, and $R^6$ are independently from each other selected from H, F, $R^7$, $OR^7$, and $OSi(R^8)_3$.

$R^1$, $R^2$, $R^3$, $R^4$, $R^5$, and $R^6$ are selected independently from each other, and may be same or different, or may partially be same and partially different.

Preferably $R^1$, $R^2$, $R^3$, $R^4$, $R^5$, and $R^6$are independently from each other selected from $R^7$, $OR^7$, and $OSi(R^8)_3$, more preferred $R^1$, $R^2$, $R^3$, $R^4$, $R^5$, and $R^6$ are independently from each other selected from $R^7$ and $OR^7$, even more preferred $R^1$, $R^2$, $R^3$, $R^4$, $R^5$, and $R^6$ are independently from each other selected from $R^7$, most preferred $R^1$, $R^2$, $R^3$, $R^4$, $R^5$, and $R^6$ are independently from each other selected from $C_1$-$C_6$ alkyl, which may be substituted by one or more substituents selected from $OSi(CH_3)_3$ and F, in particular preferred $R^1$, $R^2$, $R^3$, $R^4$, $R^5$, and $R^6$ are independently from each other selected from $C_1$-$C_4$ alkyl.

$R^7$ is selected from $C_1$-$C_6$ alkyl, $C_2$-$C_6$ alkenyl, $C_2$-$C_6$ alkynyl, $C_5$-$C_7$ (hetero)aryl, and $C_6$-$C_{13}$ (hetero)aralkyl which may be substituted by one or more substituents selected from $OSi(CH_3)_3$ and F, preferably $R^7$ is selected from $C_1$-$C_6$ alkyl, $C_2$-$C_6$ alkenyl, and $C_2$-$C_6$ alkynyl, which may be substituted by one or more substituents selected from $OSi(CH_3)_3$ and F, more preferred $R^7$ is selected from $C_1$-$C_6$ alkyl and $C_2$-$C_6$ alkenyl, which may be substituted by one or more substituents selected from $OSi(CH_3)_3$ and F, even more preferred $R^7$ is selected from $C_1$-$C_6$ alkyl, which may be substituted by one or more substituents selected from $OSi(CH_3)_3$ and F, and most preferred $R^7$ is selected from $C_1$-$C_4$ alkyl.

$R^8$ is independently at each occurrence selected from H, F, $R^7$ and $OR^7$, preferably $R^8$ is independently at each occurrence selected from $R^7$ and $OR^7$, even more preferred $R^8$ is independently at each occurrence selected from $R^7$ and most preferred $R^8$ is independently at each occurrence selected from $C_1$-$C_4$ alkyl.

According to one embodiment $R^1$, $R^2$, $R^3$, $R^4$, $R^5$, and $R^6$ are independently from each other selected from H, F, $R^7$, $OR^7$, and $OSi(R^8)_3$; wherein $R^8$ is independently at each occurrence selected from H, F, $R^7$ and $OR^7$; and $R^7$ is selected from $C_1$-$C_6$ alkyl, which may be substituted by one or more substituents selected from $OSi(CH_3)_3$ and F, preferably $R^1$, $R^2$, $R^3$, $R^4$, $R^5$, and $R^6$ are independently from each other selected from $R^7$, $OR^7$, and $OSi(R^8)_3$; wherein $R^8$ is independently at each occurrence selected from $R^7$ and $OR^7$; and $R^7$ is selected from $C_1$-$C_6$ alkyl, which may be substituted by one or more substituents selected from $OSi(CH_3)_3$ and F.

In case $R^1$ and $R^4$ are combined and jointly selected from O, $CR^9R^{10}$, and $NR^{11}$ and form a 6-membered cycle with the Si—O—P—O—Si group the compound of formula (I) is a compound of formula (Ia)

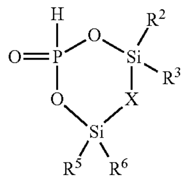

(Ia)

wherein X is selected from O, $CR^9R^{10}$, and $NR^{11}$;

$R^9$ and $R^{10}$ are selected independently from each other from H, F, $R^7$, $OR^7$, and $OSiR^8{}_3$;

$R^{11}$ is selected from H and $R^7$; and $R^2$, $R^3$, $R^5$, $R^6$, $R^8$ and $R^9$ are selected as defined above and as defined as preferred.

Preferably X is selected from O and $CR^9R^{10}$, and more preferred X is O.

$R^9$ and $R^{10}$ are selected independently from each other from H, F, $R^7$, $OR^7$, and $OSiR^8{}_3$, preferably $R^9$ and $R^{10}$ are selected independently from each other from H, $R^7$, and $OR^7$ more preferred $R^9$ and $R^{10}$ are selected independently from each other from H and $R^7$, even more preferred $R^9$ and $R^{10}$ are selected independently from each other from H and $C_1$-$C_6$ alkyl, most preferred $R^9$ and $R^{10}$ are H.

$R^{11}$ is selected from H and $R^7$, preferably $R^{11}$ is preferably selected from H, $C_1$-$C_6$ alkyl, and $C_5$-$C_7$ (hetero)aryl, more preferred $R^{11}$ is $C_1$-$C_4$ alkyl.

In case all $R^1$, $R^2$, $R^3$, $R^4$, $R^5$, and $R^6$ are independently from each other selected from H, F, $R^7$, $OR^7$, and $OSi(R^8)_3$, it is preferred that $R^1$, $R^2$, $R^3$, $R^4$, $R^5$, and $R^6$ are independently from each other selected from H, F, $R^7$, $OR^7$, and $OSi(R^8)_3$ wherein $R^7$ is selected from $C_1$-$C_6$ alkyl, $C_2$-$C_6$ alkenyl, and $C_5$-$C_7$ (hetero)aryl, which may be substituted by one or more substituents selected from $OSi(CH_3)_3$ and F, and $R^8$ is selected from $R^7$ and $OR^7$. More preferred $R^1$, $R^2$, $R^3$, $R^4$, $R^5$, and $R^6$ are independently from each other selected from H, F, $R^7$, $OR^7$, and $OSi(R^8)_3$ wherein $R^7$ is $C_1$-$C_6$ alkyl, which may be substituted by one or more substituents selected from $OSi(CH_3)_3$and F, and $R^8$ is selected from $R^7$ and $OR^7$. Even more preferred $R^1$, $R^2$, $R^3$, $R^4$, $R^5$, and $R^6$ are independently from each other selected from $R^7$, $OR^7$, and $OSi(R^8)_3$ wherein $R^7$ is $C_1$-$C_6$ alkyl and $R^8$ is selected from $R^7$ and $OR^7$. Most preferred $R^1$, $R^2$, $R^3$, $R^4$, $R^5$, and $R^6$ are independently from each other selected from $C_1$-$C_6$ alkyl which may be substituted by one or more substituents selected from $OSi(CH_3)_3$and F, in particular preferred $R^1$, $R^2$, $R^3$, $R^4$, $R^5$, and $R^6$ are independently from each other selected from $C_1$-$C_4$ alkyl.

A preferred example of compounds of formula (I) is bis(trimethylsilyl) phosphite.

The preparation of the compounds of formula (I) is known to the person skilled in the art. A description of a synthesis of bis(trimethylsilyl) phosphite may for example be found in M. Sekine et al., J. Org. Chem., Vol. 46 (1981), pages 2097 to 2107.

According to one embodiment of the present invention the electrolyte composition (C) contains at least one compounds of formula (I) as described above or as described as preferred.

$R^{1a}$ is selected independently at each occurrence from H, F, Cl, $R^{4a}$, $OR^{4a}$, $OSi(R^{5a})_3$, $OSi(OR^{4a})_3$, and $OP(O)(OR^{4a})R^{5a}$.

$R^{4a}$ is independently at each occurrence selected from $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl which may be substituted by one or more substituents selected from CN and F and wherein one or more $CH_2$-groups of alkyl, alkenyl and alkynyl which are not directly bound to the Si-atom or the O-atom may be replaced by O. Preferably $R^{4a}$ is independently at each occurrence selected from $C_1$-$C_{10}$ alkyl, which may be substituted by one or more substituents selected from CN and F and wherein one or more $CH_2$-groups of alkyl, alkenyl and alkynyl which are not directly bound to the Si-atom or the O-atom may be replaced by O, more preferred $R^{4a}$ is independently at each occurrence selected from $C_1$-$C_4$ alkyl, which may be substituted by one or more substituents selected from CN and F. For example, $R^{4a}$ may be selected from methyl, ethyl, n-propyl, i-propyl, phenyl, cyclohexyl, $CF_3$, $CF_2CF_3$ or $CH_2CN$.

$R^{5a}$ is selected independently at each occurrence from H, F, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl which may be substituted by one or more substituents selected from CN and F and wherein one or more $CH_2$-groups of alkyl, alkenyl and alkynyl which are not directly bound to the P-atom may be replaced by O, preferably $R^{5a}$ is selected independently at each occurrence from H, F, and $C_1$-$C_{10}$ alkyl, which may be substituted by one or more F and/or CN and wherein one or more $CH_2$-groups of alkyl which are not directly bound to the P-atom may be replaced by O, more preferred $R^{y}a$ is selected independently at each occurrence from H and $C_1$-$C_{10}$ alkyl, which may be substituted by one or more F and/or CN, even more preferred $R^{5a}$ is selected independently at each occurrence from H and $C_1$-$C_4$ alkyl, which may be substituted by one or more F and/or CN. For example, $R^{y}a$ may be selected from H, F, methyl, ethyl, n-propyl, i-propyl, phenyl, cyclohexyl, $CF_3$, $CF_2CF_3$ or $CH_2CN$.

Preferably $R^{1a}$ is selected independently at each occurrence from H, F, Cl, $C_1$-$C_{10}$ alkyl, and $OC_1$-$C_{10}$ alkyl, wherein alkyl may be substituted by one or more substituents selected from CN and F and wherein one or more $CH_2$-groups of alkyl which are not directly bound to the Si-atom or O-atom may be replaced by O, even more preferred $R^{1a}$ is selected independently from $C_1$-$C_{10}$ alkyl which may be substituted by one or more substituents selected from CN and F, in particular preferred $R^{1a}$ is selected independently from $C_1$-$C_4$ alkyl which may be substituted by one or more substituents selected from CN and F. $R^{1a}$ is for example selected independently at each occurrence from H, F, CI, methyl, methoxy, ethyl, ethoxy, n-propyl, n-propoxy, i-propyl, i-propoxy, phenyl, phenoxy, $CF_3$, $OCF_3$, $CF_2CF_3$, $OCF_2CF_3$, and $CH_2CN$, preferably are selected from methyl, ethyl, i-propyl and n-propyl.

$R^{3a}$ is selected independently at each occurrence from H, F, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero) aralkyl which may be substituted by one or more substituents selected from CN and F and wherein one or more $CH_2$-groups of alkyl, alkenyl and alkynyl which are not directly bound to the P-atom may be replaced by O, preferably $R^{3a}$ is selected independently at each occurrence from H, F, $C_1$-$C_{10}$ alkyl, $C_3$-$C_7$ (hetero)cycloalkyl, and $C_5$-$C_7$ (hetero)aryl, which may be substituted by one or more substituents selected from CN and F and wherein one or more $CH_2$-groups of alkyl, alkenyl and alkynyl which are not directly bound to the P-atom may be replaced by O, more preferred $R^3$ is selected independently at each occurrence from H, F, and $C_1$-$C_{10}$ alkyl, which may be substituted by one or more F and/or CN and wherein one or more $CH_2$-groups of alkyl which are not directly bound to the P-atom may be replaced by O, and even more preferred $R^{3a}$ is selected independently at each occurrence from H and $C_1$-$C_{10}$ alkyl, which may be substituted by one or more F and/or CN and wherein one or more $CH_2$-groups of alkyl which are not directly bound to the P-atom may be replaced by O. Most preferred $R^{3a}$ is selected independently at each occurrence from H and $C_1$-$C_4$ alkyl, which may be substituted by one or more F and/or CN. $R^{3a}$ may for example be selected from H, F, methyl, ethyl, n-propyl, i-propyl, cyclohexyl, phenyl, $CF_3$, $CF_2CF_3$, $CH_2CH_2OCH_3$, $CH_2CH_2OCH_3$, and $CH_2CN$. In particular preferred is $R^{3a}$ being H.

T is selected from

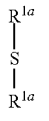

and

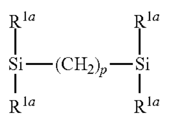

p is an integer from 0 to 6 and may be 1, 2, 3, 4, 5 or 6. One or more $CH_2$ groups of $(CH_2)p$ may be replaced by O, resulting e.g. in $CH_2$—O—$CH_2$ or $CH_2$—O—$CH_2$—O—$CH_2$. In case more than one $CH_2$ group is replaced by O, the $CH_2$ groups replaced by O are not adjacent. One or more H of $(CH_2)p$ may be replaced by $C_1$-$C_4$ alkyl. Examples for $(CH_2)p$ wherein one or more H are replaced by $C_1$-$C_4$ alkyl are $C(CH_3)H$, $C(CH_3)_2$, $C(CH_3)HCH_2$, $C(CH_3)HC(CH_3)H$, and $C(CH_3)HC(C_2H_4)H$.

Preferably silyl ester phosphonate compounds containing the structure of formula (II) are used wherein $R^{1a}$ is selected independently at each occurrence from H, F, Cl, $C_1$-$C_{10}$ alkyl, and $OC_1$-$C_{10}$ alkyl, wherein alkyl may be substituted by one or more substituents selected from CN and F and wherein one or more $CH_2$-groups of alkyl which are not directly bound to the Si-atom or O-atom may be replaced by O; and $R^{3a}$ is selected independently at each occurrence from H and $C_1$-$C_{10}$ alkyl, which may be substituted by one or more F and/or CN and wherein one or more $CH_2$-groups of alkyl which are not directly bound to the P-atom may be replaced by O.

Examples of structures of formula (II) are the following structures (II.1) to (II.6)

(II.1)

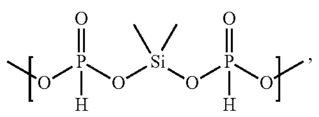

(II.2)

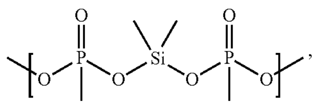

(II.3)

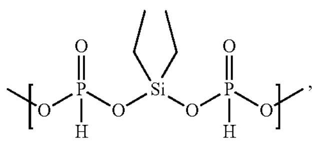

(II.4)

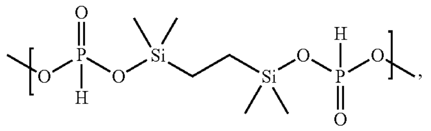

(II.5)

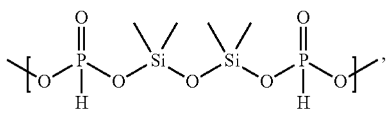

and (II.6)

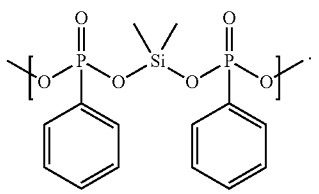

Preferably the silyl ester phosphonate compounds containing the structure of formula (II) are terminated by phosphonate groups selected from —$P(O)R^{3a}$—$OC_1$-$C_6$ alkyl, more preferred by phosphonate groups selected from —$P(O)R^{3a}$—$OC_1$-$C_4$ alkyl and in particular preferred by phosphonate groups selected from —$P(O)R^{3a}$—$OCH_3$ and —$P(O)R^{3a}$—$OCH_2CH_3$. It is particularly preferred, that the silyl ester phosphonate compounds containing the structure of formula (II) are directly terminated by the afore-mentioned phosphonate groups.

According to one embodiment the silyl ester phosphonate contains the structure of formula (III)

(III)

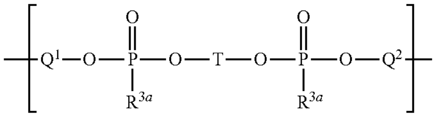

wherein $Q^1$ is a chemical bond or a monomeric or oligomeric group containing one or more monomeric units of formula (III.1) and $Q^2$ is a chemical bond or a monomeric or oligomeric group containing one or more monomeric units of formula (III.2)

(III.1)

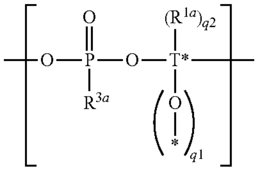

(III.2)

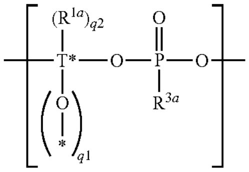

wherein

T* is independently at each occurrence Si or Si—$(CH_2)_p$—Si, wherein p is an integer of 0 to 6, i.e. p is selected from 0, 1, 2, 3, 4, 5, and 6, and one or more $CH_2$ groups of $(CH_2)_p$ may be replaced by O and one or more H of $(CH_2)$p may be replaced by $C_1$-$C_4$ alkyl, and in case T* is Si, $q^1$ is an integer from zero to 2, $q^2$ is an integer from zero to 2 and $q^1+q^2=2$, i.e. $q^1$ and $q^2$ are selected from 0, 1, and 2 wherein $q^1+q^2=2$;

in case T* is Si—$(CH_2)_p$—Si, $q^1$ is an integer from zero to 4, $q^2$ is an integer from zero to 4 and $q^1+q^2=4$, i.e. $q^1$ and $q^2$ are selected from 0, 1, 2, 3, and 4 wherein $q^1+q^2=4$;

-* is a continuation of the silylester phosphonate backbone by branching; and $R^1$ and $R^3$ are defined as described above and as described as preferred.

Examples of $Q^1$ are

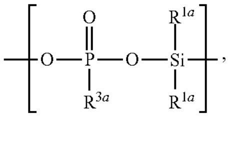 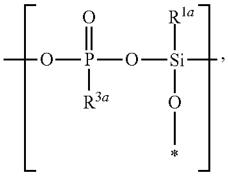

-continued

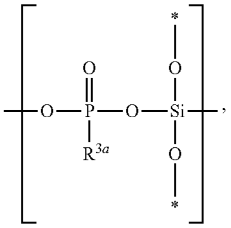

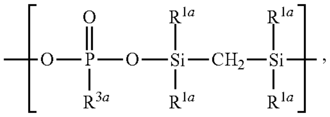

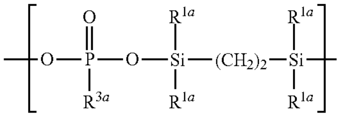

and

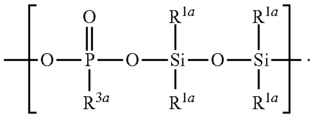

Examples of $Q^2$ are

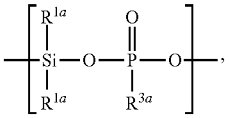 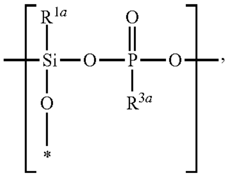

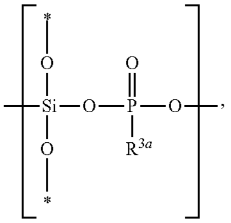

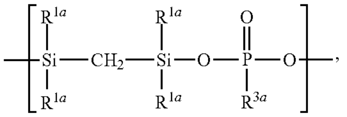

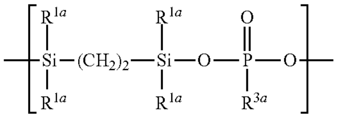

and

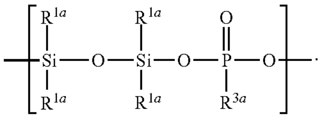

The monomeric units of $Q^1$ and $Q^2$ may be arranged in any way, e.g. randomly or in blocks or in alternating order.

Preferably $Q^1$ and/or $Q^2$ comprise at least one monomeric unit of formula (III.1) or of formula (III.2), respectively, which is no branching or crosslinking unit, i.e. wherein T* is independently at each occurrence Si or Si—$(CH_2)_p$—Si and p is an integer of 0 to 6 and one or more $CH_2$ groups of $(CH_2)_p$, may be replaced by O and one or more H of $(CH_2)$p may be replaced by $C_1$-$C_4$ alkyl, and wherein in case T* is Si, $q^1$ is zero and $q^2$ is 2, and in case T* is Si—$(CH_2)_p$—Si, $q^1$ is zero and $q^2$ is 4.

According to another embodiment the silyl ester phosphonate has the formula (IV)

(IV)

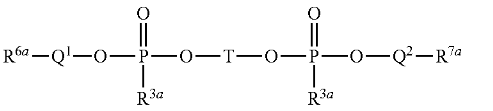

wherein $Q^1$, $Q^2$, T and $R^{3a}$ are defined as described above;

$R^{6a}$ and $R^{7a}$ are selected independently from $R^{8a}$, $Si(OR^{8a})_3$ and $Si(R^{9a})_3$;

$R^{8a}$ is selected independently at each occurrence from $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero) aralkyl which may be substituted by one or more substituents selected from CN and F and wherein one or more $CH_2$-groups of alkyl, alkenyl and alkynyl which are not directly bound to an O- or an Si-atom may be replaced by O; and $R^{9a}$ is selected independently at each occurrence from H, F, Cl, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl which may be substituted by one or more substituents selected from CN and F and wherein one or more $CH_2$-groups of alkyl, alkenyl and alkynyl which are not directly bound to an O-atom may be replaced by O.

It is preferred that $R^{6a}$ and $R^{7a}$ are independently selected from $C_1$-$C_{10}$ alkyl, $Si(OC_1$-$C_{10}$ alkyl$)_3$ and $Si(R^{9a})_3$ wherein $R^{9a}$ is selected independently at each occurrence from H, F, Cl, and $C_1$-$C_{10}$ alkyl, more preferred $R^{9a}$ is selected from H, F, Cl and $C_1$-$C_4$ alkyl. $R^{6a}$ and $R^{7a}$ may e.g. be selected from methyl, ethyl, n-propyl, i-propyl, $Si(CH_3)_3$, $Si(OCH_3)_3$, $Si(CH_3)_2Cl$ and $Si(CH_3)Cl_2$. It is even more preferred that $R^6$ and $R^7$ are independently selected from $C_1$-$C_4$ alkyl, i.e. the silyl ester phosphonates are terminated by alkoxy groups like methoxy, ethoxy, n-propoxy and n-butoxy, in particularly preferred are methoxy and ethoxy terminated silyl ester phosphonates.

In particular the silyl ester phosphonate may have the formula (V)

(V)

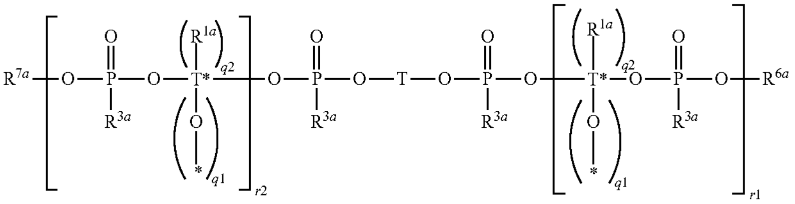

wherein $R^{1a}$, $R^{3a}$, $R^{6a}$, $R^{7a}$, T, T*, $q^1$ and $q^2$ are defined as above and as preferred; and $r^1$ and $r^2$ are independently integers from 0 to 300.

The silyl ester phosphonate compounds containing the structure of formula (II) may be used as mixtures of different silyl ester phosphonate compounds with different molecular weights, in particular as mixtures of a monomeric silyl ester phosphonate compound containing the structure of formula (II) which does not contain a repeating monomeric unit and at least one oligomeric or polymeric silyl ester phosphonate compound which contains the structure of formula (II) and one or more repeating monomeric units, e.g. a mixture of a compound of formula (V) wherein $r^1$ and $r^2$ are both zero and at least one oligomeric or polymeric silyl ester phosphonate of formula (V) wherein $r^1+r^2>1$.

The preparation of similar silyl ester phosphonate compounds containing the structure of formula (II) is known to the person skilled in the art, see e.g. K. Kellner, L. Rodewald, Monatshefte für Chemie, Vol. 121 (1990), pages 1031 to 1038. The silyl ester phosphonate compounds containing the structure of formula (II) may be prepared in analogy. Depending on the starting materials linear compounds or compounds with branching points or cross-linking function are obtainable. E.g. the reaction of $(CH_3)_2SiCl_2$ with dimethyl phosphite will result in linear silylester phosphonates. In case a portion of $(CH_3)_2SiCl_2$ is substituted by $(CH_3)SiCl_3$ or $SiCl_4$ monomeric units are introduced into the silylester phosphonates which function as branching or crosslinking points. Furthermore $(CH_3)_2SiCl_2$ can be substituted by alkyliden spaced dichloro disilanes e.g. $Cl(CH_3)_2Si(CH_2)_2Si(CH_3)_2Cl$. Depending on the starting compounds, the molar ratios and the reaction conditions different silyl ester phosphonates and often mixtures of monomeric silylester phosphonate and one or more oligomeric and polymeric silyl ester phosphonates with different molecular weights are obtained. A detailed description of silyl ester phosphonate compounds containing the structure of formula (II) and their use as additives in electrolyte compositions for electrochemical cells can be found in the not yet published international patent application PCT/EP2018/084385.

According to one embodiment of the present invention the electrolyte composition (C) contains at least one silyl ester phosphonate compound containing a structure of formula (II) as described above or described as preferred.

The electrolyte composition may contain one silylester phosphonate, it may contain more than one silyl ester phosphonate, e.g. two, three or more.

Usually the electrolyte composition contains in total at least 0.01 wt.-% of the at least one silyl ester phosphonate, based on the total weight of electrolyte composition, preferably at least 0.02 wt.-%, and more preferred at least 0.1 wt.-%, based on the total weight of electrolyte composition. The maximum value of the total concentration of the silyl ester phosphonates in the electrolyte composition is usually 30 wt.-%, based on the total weight of electrolyte composition, preferably 10 wt.-%, more preferred the upper limit of the total concentration of the silyl ester phosphonates is 5 wt.-%, and even more preferred 3 wt.-%, based on the total weight of electrolyte composition. Usually the electrolyte composition contains in total 0.01 to 30 wt.-%, of the at least one silyl ester phosphonate, based on the total weight of electrolyte composition, preferably 0.02 to 10 wt.-%, more preferably 0.1 to 5 wt.-% and most preferred 0.1 to 3 wt.-%.

The silyl ester phosphonate(s) contained in the electrolyte composition may react with one or more components present in the electrolyte composition like the lithium ion containing conducting salt, e.g. a silyl ester phosphonate containing a $OSiR_3$ group may form complexes with fluorine ligand containing complex salts like $LiPF_6$, $LiBF_4$ or lithium difluoro(oxalato) borate. The formation of such complexes has no impact on the positive technical effect of the addition of the silyl ester phosphonate(s) to the electrolyte composition.

Furthermore, the electrolyte composition (C) may contain one or more further additives (iv) different from the silyl ester phosphonates. The at least one further additive different from the silyl ester phosphonates may be selected from polymers, film forming additives, flame retardants, overcharging additives, wetting agents, HF and/or $H_2O$ scavenger, stabilizer for $LiPF_6$ salt, ionic solvation enhancer, corrosion inhibitors, and gelling agents.

The minimum concentration of the further additive(s) (iv) is usually 0.005 wt.-%, preferably the minimum concentration is 0.01 wt.-% and more preferred the minimum concentration is 0.1 wt.-%, based on the total weight of electrolyte composition. The maximum concentration of the at least further additive is usually 25 wt.-%.

One class of further additives are polymers. Polymers may be selected from polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. Polymers may be added to a formulation according to the present invention in order to convert liquid formulations into quasi-solid or solid electrolytes and thus to improve solvent retention, especially during ageing. In this case they function as gelling agents.

Examples of flame retardants are organic phosphorous compounds like cyclophosphazenes, phosphoramides, alkyl and/or aryl tri-substituted phosphates, alkyl and/or aryl di- or tri-substituted phosphites, alkyl and/or aryl di-substituted phosphonates, alkyl and/or aryl tri-substituted phosphines, and fluorinated derivatives thereof.

Examples of HF and/or $H_2O$ scavenger are optionally halogenated cyclic and acyclic silylamines.

Examples of overcharge protection additives are cyclohexylbenzene, o-terphenyl, p-terphenyl, and biphenyl and the like, preferred are cyclohexylbenzene and biphenyl.

Another class of additives are film forming additives, also called SEI-forming additives. An SEI forming additive according to the present invention is a compound which decomposes on an electrode to form a passivation layer on the electrode which prevents degradation of the electrolyte and/or the electrode. In this way, the lifetime of a battery is significantly extended. Preferably the SEI forming additive forms a passivation layer on the anode. An anode in the context of the present invention is understood as the negative electrode of a battery. Preferably, the anode has a reduction potential of 1 Volt or less against lithium such as a lithium intercalating graphite anode. In order to determine if a compound qualifies as anode film forming additive, an electrochemical cell can be prepared comprising a graphite electrode and a metal counter electrode, and an electrolyte containing a small amount of said compound, typically from 0.1 to 10 wt.-% of the electrolyte composition, preferably from 0.2 to 5 wt.-% of the electrolyte composition. Upon application of a voltage between anode and lithium metal, the differential capacity of the electrochemical cell is recorded between 0.5 V and 2 V. If a significant differential capacity is observed during the first cycle, for example −150 mAh/V at 1 V, but not or essentially not during any of the following cycles in said voltage range, the compound can be regarded as SEI forming additive.

According to the present invention the electrolyte composition preferably contains at least one SEI forming additive. SEI forming additives are known to the person skilled in the art. More preferred the electrolyte composition contains at least one SEI forming selected from vinylene carbonate and its derivatives such as vinylene carbonate and methylvinylene carbonate; fluorinated ethylene carbonate and its derivatives such as monofluoroethylene carbonate, cis- and trans-difluorocarbonate; organic sultones such as propylene sultone, propane sultone and their derivatives; ethylene sulfite and its derivatives; oxalate comprising compounds such as lithium oxalate, oxalato borates including dimethyl oxalate, lithium bis(oxalate) borate, lithium difluoro (oxalato) borate, and ammonium bis(oxalato) borate, and oxalato phosphates including lithium tetrafluoro (oxalato) phosphate; and sulfur containing additives as described in detail in WO 2013/026854 A1, in particular the sulfur containing additives shown on page 12 line 22 to page 15, line 10.

A compound added may have more than one effect in the electrolyte composition and the electrochemical cell comprising the electrolyte composition. E.g. lithium oxalato borate may be added as additive enhancing the SEI formation but can also function as conducting salt.

The electrolyte composition (C) is preferable non-aqueous. In one embodiment of the present invention the water content of the electrolyte composition is preferably below 100 ppm, based on the weight of the respective inventive formulation, more preferred below 50 ppm, most preferred below 30 ppm. The water content may be determined by titration according to Karl Fischer, e.g. described in detail in DIN 51777 or ISO760: 1978. The minimum water content of electrolyte compositions may be selected from 3 ppm, preferably 5 ppm.

In one embodiment of the present invention, the HF-content of the electrolyte composition is preferably below 100 ppm, based on the weight of the respective inventive formulation, more preferred below 50 ppm, most preferred below 30 ppm. The HF content may be determined by titration.

The electrolyte composition is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C. Such liquid electrolyte compositions are particularly suitable for outdoor applications, for example for use in automotive batteries.

The electrolyte composition (A) may be prepared by methods which are known to the person skilled in the field of the production of electrolytes, generally by dissolving the lithium conductive salt(s) (i) in the corresponding solvent or solvent mixture (ii) and adding component(s) (iii) and optionally further additive(s) (iv), as described above.

A further embodiment of the present invention refers to electrochemical cells as defined above wherein the electrolyte composition is obtainable by adding at least one silyl ester phosphonate selected from compounds of formula (I)

and silyl ester phosphonate compounds containing the structure of formula (II) to a mixture of at least one solvent or solvent mixture (ii) and lithium ion containing conducting salt(s) (i) and optionally one or more further additive(s) (iv), as described above.

The electrochemical cell comprising the electrolyte composition (A) may be a lithium battery, a double layer capacitor, or a lithium ion capacitor. The general construction of such electrochemical devices is known and is familiar to the person skilled in this art for batteries.

Preferably the inventive electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds. The lithium battery is preferably a secondary lithium battery, i.e. a rechargeable lithium battery.

In particular preferred embodiments the electrochemical cell is a lithium ion battery, i.e. a secondary lithium ion electrochemical cell comprising a cathode (A) comprising a cathode active material that can reversibly occlude and release lithium ions and an anode (B) comprising an anode active material that can reversibly occlude and release lithium ions.

Anode (A) comprises an anode active material that can reversibly occlude and release lithium ions or is capable to form an alloy with lithium. In particular carbonaceous material that can reversibly occlude and release lithium ions can be used as anode active material. Carbonaceous materials suited are crystalline carbon such as a graphite materials, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon; and carbonic anode active material (thermally decomposed carbon, coke, graphite) such as a carbon composite, combusted organic polymer, and carbon fiber. A preferred carbonaceous material is graphite.

Further examples of anode active materials are lithium metal and lithium metal alloys, i.e. materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

Further possible anode active materials are silicon containing materials. Silicon containing materials include silicon itself, e.g. amorphous and crystalline silicon, silicon containing compounds, e.g. $SiO_x$ with $0<x<1.5$ and Si alloys, and compositions containing silicon and/or silicon containing compounds, e.g. silicon/graphite composites and carbon coated silicon containing materials. Silicon itself may be used in different forms, e.g. in the form of nanowires, nanotubes, nanoparticles, films, nanoporous silicon or silicon nanotubes. The silicon may be deposited on a current collector. Current collector may be selected from coated metal wires, a coated metal grid, a coated metal web, a coated metal sheet, a coated metal foil or a coated metal plate. Preferably, current collector is a coated metal foil, e.g. a coated copper foil. Thin films of silicon may be deposited on metal foils by any technique known to the person skilled in the art, e.g. by sputtering techniques. One method of preparing thin silicon film electrodes are described in R. Elazari et al.; Electrochem. Comm. 2012, 14, 21-24.

Other possible anode active materials are lithium ion intercalating oxides of Ti. Preferably the anode active material comprises carbonaceous material that can reversibly occlude and release lithium ions, particularly preferred the carbonaceous material that can reversibly occlude and release lithium ions is selected from crystalline carbon, hard carbon and amorphous carbon, and particularly preferred is graphite. It is also preferred that the anode active material comprises silicon containing materials. It is further preferred that the anode active material comprises lithium ion intercalating oxides of Ti.

The inventive electrochemical cell comprises a cathode (B) comprising at least one particulate cathode active material selected from mixed lithium transition metal oxides containing Mn and at least one second transition metal; lithium intercalating mixed oxides containing Ni, Al and at least one second transition metal; and lithium metal phosphates, wherein the outer surface of said particulate cathode active material is at least partially coated with an oxide selected from transition metal oxides, lanthanide oxides, and oxides of metals and half metals of groups 2, 13, and 14 of the periodic system.

Examples of mixed lithium transition metal oxides containing Mn and at least one second transition metal are lithium transition metal oxides with layered structure of formula (VI)

$$Li_{1+e}(Ni_aCo_bMn_cM_d)_{1-e}O_2 \quad (VI)$$

wherein a is in the range of from 0.05 to less than 1, b is in the range of from zero to 0.35, c is in the range of from 0.01 to 0.9, d is in the range of from zero to 0.2, e is in the range of from zero to 0.3, with a+b+c+d=1, and M being one or more metals selected from Na, K, B, Al, Mg, Ca, Cr, V, Mo, Ti, Fe, W, Nb, Zr, and Zn.

Cobalt containing compounds of formula (VI) are also named NCM.

Lithium transition metal oxides with layered structure of formula (VI) wherein e is larger than zero are also called overlithiated.

Preferred lithium transition metal oxides with layered structure of formula (VI) are compounds forming a solid solution wherein a $LiM'O_2$ phase in which M' is Ni, and optionally one or more transition metals selected from Co and Mn and a $Li_2MnO_3$ phase are mixed and wherein one or more metal M as defined above may be present. The one or more metals M are also called "dopants" or "doping metal" since they are usually present at minor amounts, e.g. at maximum 10 mol-% M or at maximum 5 mol-% M or at maximum 1 mol.-% based on the total amount of metal except lithium present in the transition metal oxide. In case one or more metals M are present, they are usually present in an amount of at least 0.01 mol-% or at least 0.1 mol-% based on the total amount of metal except lithium present in the transition metal oxide. These compounds are also expressed by formula (VI.2)

$$zLiM'O_2\cdot(1-z)Li_2MnO_3 \qquad (VI.1)$$

wherein M' is Ni and at least one metal selected from Mn and Co;

z is 0.1 to 0.8, and wherein one or more metals selected from Na, K, B, Al, Mg, Ca, Cr, V, Mo, Ti, Fe, W, Nb, Zr, and Zn may be present.

Electrochemically, the Ni and if present Co atoms in the $LiM'O_2$ phase participate in reversible oxidation and reduction reactions leading to Li-ions deintercalation and intercalation, respectively, at voltages below 4.5 V vs. $Li^+/Li$, while the $Li_2MnO_3$ phase participates only in oxidation and reduction reactions at voltages equal or above 4.5 V vs. $Li^+/Li$ given that Mn in the $Li_2MnO_3$ phase is in its +4 oxidation state. Therefore, electrons are not removed from the Mn atoms in this phase but from the 2p orbitals of oxygen ions, leading to the removal of oxygen for the lattice in the form of $O_2$ gas at least in the first charging cycling.

These compounds are also called HE-NCM due to their higher energy densities in comparison to usual NCMs. Both HE-NCM and NCM have operating voltages of about 3.0 to 3.8 V against $Li/Li^+$, but high cut off voltages have to be used both for activating and cycling of HE-NCMs to actually accomplish full charging and to benefit from their higher energy densities. Usually the upper cut-off voltage for the cathode during charging against $Li/Li^+$ is of at least 4.5 V for activating the HE-NCM, preferably of at least 4.6 V, more preferred of at least 4.7 V and even more preferred of at least 4.8 V. The term "upper cut-off voltage against $Li/Li^+$ during charging" of the electrochemical cell means the voltage of the cathode of the electrochemical cell against a $Li/Li^+$ reference anode which constitute the upper limit of the voltage at which the electrochemical cell is charged. Examples of HE-NCMs are $0.33Li_2MnO_3\cdot0.67Li(Ni_{0.4}Co_{0.2}Mn_{0.4})O_2$, $0.42Li_2MnO_3\cdot0.58Li(Ni_{0.4}Co_{0.2}Mn_{0.4})O_2$, $0.50Li_2MnO_3\cdot0.50Li(Ni_{0.4}Co_{0.2}Mn_{0.4})O_2$, $0.40Li_2MnO_3\cdot0.60Li(Ni_{0.8}Co_{0.2}Mn_{0.1})O_2$, and $0.42Li_2MnO_3\cdot0.58Li(Ni_{0.6}Mn_{0.4})O_2$.

Examples of manganese-containing transition metal oxides with layer structure of formula (II) wherein d is zero are $LiNi_{0.33}Mn_{0.67}O_2$, $LiNi_{0.25}Mn_{0.75}O_2$, $LiNi_{0.35}Co_{0.15}Mn_{0.5}O_2$, $LiNi_{0.21}Co_{0.08}Mn_{0.71}O_2$, $LiNi_{0.22}Co_{0.12}Mn_{0.66}O_2$, $LiNi_{0.8}Co_{0.1}Mn_{0.1}O_2$, $LiNi_{0.6}Co_{0.2}Mn_{0.2}O_2$, and $LiNi_{0.5}Co_{0.2}Mn_{0.3}O_2$. It is preferred that the transition metal oxides of general formula (II) wherein d is zero do not contain further cations or anions in significant amounts.

Examples of manganese-containing transition metal oxides with layer structure of formula (II) wherein d is larger than zero are $0.33Li_2MnO_3\cdot0.67Li(Ni_{0.4}Co_{0.2}Mn_{0.4})O_2$, $0.42Li_2MnO_3\cdot0.58Li(Ni_{0.4}Co_{0.2}Mn_{0.4})O_2$, $0.50Li_2Mn_3\cdot0.50Li(Ni_{0.4}Co_{0.2}Mn_{0.4})O_2$, $0.40Li_2MnO_3\cdot0.60Li(Ni_{0.8}Co_{0.1}Mn_{0.1})O_2$, and $0.42Li_2MnO_3\cdot0.58Li(Ni_{0.6}Mn_{0.4})O_2$ wherein one or more metal M selected from Na, K, Al, Mg, Ca, Cr, V, Mo, Ti, Fe, W, Nb, Zr, and Zn may be present. The one or more doping metal is preferably present up to 1 mol-%, based on the total amount of metal except lithium present in the transition metal oxide.

Other preferred compounds of formula (VI) are Ni-rich compounds, wherein the content of Ni is at least 50 mol. % based on the total amount of transition metal present. This includes compounds of formula (VI.3)

$$Li_{1+e}(Ni_aCo_bMn_cM_d)_{1-e}O_2 \qquad (VI.2)$$

wherein a is in the range of from 0.5 to 0.95, preferred in the range of 0.6 to 0.95, b is in the range of from zero to 0.35, c is in the range of from 0.0.025 to 0.5, preferred in the range of 0.025 to 0.4, d is in the range of from zero to 0.2, e is in the range of from zero to 0.3, with a+b+c+d=1, and M being one or more metals selected from Na, K, B, Al, Mg, Ca, Cr, V, Mo, Ti, Fe, W, Nb, Zr, and Zn.

Preferred lithium transition metal oxides with layered structure are such of structure (VI.3)

$$Li_{1+e}[(Ni_{a1}Co_{b1}Mn_{c1})_{1-d1}M_{d1}]_{1-e}O_2 \qquad (VI.3)$$

wherein a1 is in the range of from 0.6 to 0.95, b1 is in the range of from 0.025 to 0.2, c1 is in the range of from 0.025 to 0.2, d1 is in the range of from zero to 0.1, e is in the range of from zero to 0.2

Examples of Ni-rich compounds of formula (I) are $Li[Ni_{0.8}Co_{0.1}Mn_{0.1}]O_2$ (NCM 811), $Li[Ni_{0.6}Co_{0.2}Mn_{0.2}]O_2$ (NCM 622), and $Li[Ni_{0.5}Co_{0.2}Mn_{0.3}]O_2$ (NCM 523).

Further examples of mixed lithium transition metal oxides containing Mn and at least one second transition metal are manganese-containing spinels of formula (VII)

$$Li_{1+t}M_{2-t}O_{4-s} \qquad (VII)$$

wherein s is 0 to 0.4, t is 0 to 0.4, and

M is Mn and at least one further metal selected from Co and Ni, preferably M is Mn and Ni and optionally Co, i.e. a part of M is Mn and another part of Ni, and optionally a further part of M is selected from Co.

The cathode active material may also be selected from lithium intercalating mixed oxides containing Ni, Al and at least one second transition metal, e.g. from lithium intercalating mixed oxides of Ni, Co and Al. Examples of mixed oxides of Ni, Co and Al are compounds of formula (VIII)

$$Li[Ni_hCo_iAl_j]O_2 \qquad (VIII)$$

wherein h is 0.7 to 0.9, preferred 0.8 to 0.87, and more preferred 0.8 to 0.85;

i is 0.15 to 0.20; and j is 0.02 to 10, preferred 0.02 to 1, more preferred 0.02 to 0.1, and most preferred 0.02 to 0.03.

The cathode active material may also be selected from lithium metal phosphates like $LiMnPO_4$, $LiNiPO_4$ and $LiCoPO_4$. These phosphates show usually olivine structure and usually upper cut-off voltages of at least 4.5 V have to be used for charging.

The outer surface of the particulate cathode active material is at least partially coated with an oxide selected from transition metal oxides, lanthanide oxides, and oxides of metals and half metals of groups 2, 13, and 14 of the periodic system. Examples of transition metal oxides are scandium oxide, yttria, titania, zirconia, vanadium oxide, niobium oxide, tantalum oxide, molybdenum oxide, zinc oxide, and cobalt oxide. Examples of lanthanide oxides are lanthanum oxide, ceria, praseodymium oxide, neodymium oxide, samarium oxide, and gadolinium oxide. Examples of oxides of metals of group 2 are calcium oxide, strontium oxide, and barium oxide. Examples of oxides of metals and half metals of group 13 are boron oxide, aluminum oxyhydroxide, alumina, and gallium oxide. Examples of oxides of metals and half metals of group 14 are silicon oxide, germanium oxide, and tin oxide.

The cathode active material may be coated with an oxide selected from scandium oxide, yttria, titania, zirconia, vanadium oxide, niobium oxide, tantalum oxide, molybdenum oxide, zinc oxide, cobalt oxide, lanthanum oxide, ceria, praseodymium oxide, neodymium oxide, samarium oxide, gadolinium oxide, calcium oxide, strontium oxide, barium oxide, boron oxide, aluminum oxyhydroxide, alumina, gallium oxide silicon oxide, germanium oxide, tin oxide, and mixtures thereof.

Preferably the cathode active material is at least partially coated with an oxide selected from boron oxide, aluminum oxyhydroxide, alumina, zirconia, titania, cobalt oxide and mixtures thereof, more preferred the oxide forming the coating is selected from aluminum oxyhydroxide, alumina, cobalt oxide and mixtures thereof, and in particular preferred from aluminum oxyhydroxide, alumina, and mixtures thereof.

The term “partially coated” as used in the context with the present invention takes into account that in practice it may be difficult to prepare particles coated by the oxide layer without any defects in said oxide layer. Preferably the term “partially coated” as used herein means that at least 80% of the particles of a batch of particulate material being coated, and to at least 75% of the surface of each particle being coated, for example 75 to 99.99% and preferably 80 to 90%.

The thickness of such coating may be very low, for example 0.1 to 5 nm. In other embodiments, the thickness may be in the range of from 6 to 15 nm. In further embodiments, the thickness of such coating is in the range of from 16 to 50 nm. The thickness in this context refers to an average thickness determined mathematically by calculating the amount of thickness per particle surface and assuming a 100% conversion of the starting materials used for preparing the coating.

Without wishing to be bound by any theory, it is believed that non-coated parts of particles do not react during the preparation of the coating due to specific chemical properties of the particles, for example density of chemically reactive groups such as, but not limited to hydroxyl groups, oxide moieties with chemical constraint, or to adsorbed water.

In one embodiment of the present invention the cathode active material has an average particle diameter (D50) in the range of from 3 to 20 μm, preferably from 5 to 16 μm, wherein D50 is defined as the diameter at which 50% of the mass of a sample is comprised of smaller particle. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, the cathode active material has a BET surface in the range of from 0.1 to 1 $m^2/g$. the BET surface may be determined by nitrogen adsorption after outgassing of the sample at 200° C. for 30 minutes or more and beyond this accordance with DIN ISO 9277:2010.

The partially coated particulate cathode active material used according to the invention may be prepared by the following process:

(a) providing a particulate cathode active material selected from the cathode active materials described above,
(b) treating said cathode active material with a suited precursor compound like an organic metal or half metal compound or a metal or half metal halide,
(c) treating the material obtained in step (b) with moisture,
(d) repeating the sequence of steps (b) and (c) twice to ten times, wherein in the last sequence of steps (b) and (c), the moisture may be at least partially substituted by ozone,
(e) optionally performing a post-treatment by heating the material obtained after the last step (d) at a temperature from 200 to 800° C.

The particulate cathode active material provided in step (a) may contain a certain amount of residual moisture, e.g. water which is adsorbed from the surrounding air during handling of the cathode active material. It is preferred to provide a particulate cathode active material having a residual moisture content in the range of from 50 to 1000 ppm, more preferably from 100 to 400 ppm, but it is also possible to use cathode active material having a higher or lower moisture content. The residual moisture content of the cathode active material may be determined by Karl-Fischer titration.

It is possible to conduct a heat treatment step between step (a) and (b), e.g. to reduce the moisture content of the particulate cathode active material provided in step (a). Such heat treatment may comprise keeping the particulate cathode active material for 10 minutes to 24 h at a temperature of from 100 to 300° C.

In step (b), said cathode active material is treated with a suited precursor compound like an organic metal or half metal compound or a metal or half metal halide. The precursor compound is hereinafter also called “precursor”. The precursor is selected to yield the desired metal or half metal oxide layer on the particulate cathode active material.

Examples of suited organic metal or half metal compounds are metal or half metal alkoxides, alkyl metal or half metal compounds, metal or half metal amides, and organic chelato metal complexes.

The alkyl metal or half metal compound, metal or half metal alkoxide or metal or half metal amide, respectively, may be selected from $Al(R^A)_3$, $Al(R^A)_2OH$, $AlR^A(OH)_2$, $M^1(R^A)_{4-y}H_y$, $Al(OR^B)_3$, $M^1(OR^A)_4$, $M^1[NR^B)_2]_4$, $B(OR^B)_3$, and methyl alumoxane, wherein $R^A$ are different or equal and selected from $C_1$-$C_8$-alkyl, straight-chain or branched,
$R^B$ are different or equal and selected from $C_1$-$C_4$-alkyl, straight-chain or branched, and
$M^1$ is Ti or Zr, with Ti being preferred.

Metal and half metal alkoxides may be selected from $C_1$-$C_4$-alkoxides of aluminum, boron, and transition metals. Preferred transition metals are titanium and zirconium. Examples of alkoxides are methanolates, hereinafter also referred to as methoxides, ethanolates, hereinafter also referred to as ethoxides, propanolates, hereinafter also referred to as propoxides, and butanolates, hereinafter also referred to as butoxides. Specific examples of propoxides are n-propoxides and iso-propoxides. Specific examples of butoxides are n-butoxides, iso-butoxides, sec.-butoxides and tert.-butoxides. Combinations of alkoxides are feasible as well.

Preferred examples of metal $C_1$-$C_4$-alkoxides are $Ti[OCH(CH_3)_2]_4$, $Ti(OC_4H_9)_4$, $Zr(OC_4H_9)_4$, $Zr(OC_2H_5)_4$, $B(OCH_3)_3$, $Al(OCH_3)_3$, $Al(OC_2H_5)_3$, $Al(O\text{-}n\text{-}C_3H_7)_3$, $Al(O\text{-}iso\text{-}C_3H_7)_3$, $Al(O\text{-}sec.\text{-}C_4H_9)_3$, and $Al(OC_2H_5)(O\text{-}sec.\text{-}C_4H_9)_2$.

Examples of aluminum alkyl compounds are trimethyl aluminum, triethyl aluminum, triisobutyl aluminum, and methyl alumoxane.

Metal amides are sometimes also referred to as metal imides. Examples of metal amides are $Zr[N(C_2H_5)_2)]_4$, $Zr[N(CH_3)_2]_4$, $Zr[(CH_3)N(C_2H_5)]_4$ and $Ti[N(CH_3)_2]_4$.

Examples of organic chelato metal complexes are Cobalt (II) acetylacetonate ($Co(acac)_2$), Cobalt(III) acetylacetonate $Co(acac)_3$, and bis(2,2,6,6-tetramethyl-3,5-heptanedionato) cobalt(II) ($Co(thd)_2$).

Examples of metal and half metal halides are $BBr_3$, $BCl_3$, $CoI_2$, $TiCl_4$, and $ZrCl_4$.

Particularly preferred precursors are selected from metal and half metal $C_1$-$C_4$-alkoxides and metal and half metal alkyl compounds and organic chelato metal complexes, and even more preferred is trimethyl aluminum.

In one embodiment of the present invention, the amount of the precursor is in the range of 0.1 to 1 g/kg particulate cathode active material. Preferably, the amount of the precursor is calculated to amount to 80 to 200% of a monomolecular layer on the particulate cathode active material per cycle.

Step (b) may be performed at a temperature in the range of from 15 to 1000° C., preferably 15 to 500° C., more preferably 20 to 350° C., and even more preferably 50 to 220° C. It is preferred to select a temperature in step (b) at which the precursor is in the gas phase. Step (b) is usually carried out at normal pressure but may as well be carried out at reduced or elevated pressure, e.g. at a pressure in the range of from 5 mbar to 1 bar above normal pressure or in the range of 100 to 1 mbar below normal pressure. In the context of the present invention, normal pressure is 1 atm or 1013 mbar.

Step (b) of the inventive process as well as step (c) may be carried out in the same or in different vessels. The duration of step (b) is preferably in the range of from 1 second to 2 hours, preferably 1 second up to 10 minutes.

In step (c), the material obtained in step (b) is treated with moisture. Step (c) is usually carried out at a temperature in the range of from 50 to 250° C. and may be carried out at normal pressure but step (c) may as well at reduced or elevated pressure. For example, step (c) may be carried out at a pressure in the range of from 5 mbar to 1 bar above normal pressure or at a pressure in the range of from 150 mbar to 560 mbar above normal pressure. Steps (b) and (c) may be carried out at the same pressure or at different pressures, preferred is at the same pressure.

Said moisture may be introduced, e.g., by treating the material obtained in accordance with step (b) with moisture saturated inert gas, for example with moisture saturated nitrogen or moisture saturated noble gas, for example argon. Saturation may refer to normal conditions or to the reaction conditions in step (c). Step (c) may be performed in a rotary kiln, in a free fall mixer, in a continuous vibrating bed or a fluidized bed. The duration of step (c) is usually in the range of from 1 second to 2 hours, preferably 1 second up to 5 minutes.

The reactor in which the coating process is carried out may be flushed or purged with an inert gas between steps (b) and (c), for example with dry nitrogen or with dry argon. Suitable flushing—or purging—times are 1 second to 10 minutes. It is preferred that the amount of inert gas is sufficient to exchange the contents of the reactor of from one to 15 times. By such flushing or purging, the production of by-products such as separate particles of reaction product of the precursor with water can be avoided. In the case of the couple trimethyl aluminum and water, such by-products are methane and alumina or trimethyl aluminum that is not deposited on the particulate material, the latter being an undesired by-product. Said flushing may also take place after step (c), thus before another step (b).

It is also possible to evacuate the reactor between steps (b) and (c). Said evacuating may also take place after step (c), thus before another step (b). Evacuation in this context includes any pressure reduction, for example 10 to 1000 mbar (abs), preferably 10 to 500 mbar (abs).

Each of steps (b) and (c) may be carried out in a fixed bed reactor, in a fluidized bed reactor, in a continuous vibrating bed, in a forced flow reactor, in a rotary kiln or in a mixer, for example in a compulsory mixer or in a free-fall mixer. Examples of fluidized bed reactors are spouted bed reactors. Examples of compulsory mixers are ploughshare mixers, paddle mixers and shovel mixers. Preferred are ploughshare mixers. Preferred ploughshare mixers are installed horizontally, the term horizontal referring to the axis around which the mixing element rotates. Preferably, the coating process is carried out in a shovel mixing tool, in a paddle mixing tool, in a Becker blade mixing tool and, most preferably, in a ploughshare mixer in accordance with the hurling and whirling principle. Free fall mixers are using the gravitational force to achieve mixing. In a preferred embodiment, steps (b) and (c) of the inventive process are carried out in a drum or pipe-shaped vessel that rotates around its horizontal axis. More preferred, steps (b) and (c) are carried out in a rotating vessel that has baffles.

Repetition may include repeating a sequence of steps (b) and (c) each time under exactly the same conditions or under modified conditions but still within the range of the above definitions. For example, each step (b) may be performed under exactly the same conditions, or, e.g., each step (b) may be performed under different temperature conditions or with a different duration, for example 120° C., then 10° C. and 160° C. each from 1 second to 1 hour.

Step (d) includes repeating the sequence of steps (b) and (c) twice to 10 times. It is possible to substitute the moisture at least partially by ozone in the last sequence of steps (b) and (c). In this case it is preferred that in step (c) no humidity is applied, and moisture is fully replaced by ozone. Ozone may be generated from oxygen under conditions known per se, and therefore, the ozone usually is applied in the presence of oxygen. In case of the application of ozone in the last step (c) it is preferred that no nitrogen is present.

It is possible to perform a post-treatment by heating the material obtained after the last step (d) at a temperature from 200 to 400° C., preferred are 250 to 350° C., also referred to as step (e).

Step (e) may be carried out in an atmosphere of inert gas, for example nitrogen or a noble gas such as argon. Preferably, such inert gas has a water content in the range of from 50 to 400 ppm, preferably 100 to 200 ppm, and a carbon dioxide content ion the range of from 50 to 400 ppm. The CO, content may be determined by, e.g., optical methods using infrared light. Step (e) may have a duration in the range of from 10 seconds to 2 hours, preferred are 10 minutes to 2 hours. It is preferred to carry out step (e) at normal pressure. Step (e) may be performed in a rotary kiln. It is possible to perform step (e) in the same vessel as step (c).

Cathode (B) may comprise further components like binders and electrically conductive materials such as electrically conductive carbon. For example, cathode (B) may comprise carbon in a conductive polymorph, for example selected from graphite, carbon black, carbon nanotubes, graphene or mixtures of at least two of the aforementioned substances. Examples of binders used in cathode (B) are organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth) acrylonitrile and 1,3-butadiene, especially styrene-butadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

Anode (A) and cathode (B) may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive electrochemical cells may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin or Nafion separators.

Several inventive electrochemical cells may be combined with one another, for example in series connection or in parallel connection. Series connection is preferred. The present invention further provides for the use of inventive electrochemical cells as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven staplers. But the inventive electrochemical cells can also be used for stationary energy stores.

The present invention is further illustrated by the following examples that do not, however, restrict the invention.

Experimental Section:

I. Cathode Active Materials (CAM)

The following cathode active material were used:

CAM 1: Aluminum-doped $Li_{1.02}(Ni_{0.6}Co_{0.2}Mn_{0.2})_{0.98}O_2$ (NCM622) having an average particle size D50 of 9.3 μm determined using the technique of laser diffraction in a Mastersize 3000 instrument from Malvern Instruments. Al-content was determined by ICP analytics (inductively coupled plasma mass spectrometry) and corresponded to 815 ppm. Residual moisture content at 250° C. was determined to be 645 ppm.

CAM 2: Material obtained by coating 1500 g of CAM 1, which were inside a fluidized bed reactor under vacuum conditions. The fluidized bed reactor was heated by an external heating jacket to 180° C. and kept at 180° C. for 1080 min. Afterwards the powder was kept at 180° C. Trimethylaluminum (TMA) in the gaseous state was introduced into the fluidized bed reactor through a filter plater by opening a valve to a precursor reservoir which was kept at 50° C., containing TMA in liquid form. The flow was diluted by nitrogen as carrier gas. After this the reactor was purged with nitrogen. Afterwards, water in the gaseous state was introduced into the fluidized bed reactor by opening a valve to a precursor reservoir which was kept at 24° C., containing liquid $H_2O$. Next the reactor was purged with nitrogen. This sequence was repeated for 4 times. The reactor was cooled to 25° C. and the material was unloaded. The average particle diameter D50 was determined using the technique of laser diffraction in a Mastersize 3000 instrument from Malvern Instruments to be 9.3 μm. The Al-content was determined by ICP analytics and corresponded to 1962 ppm. Residual moisture at 250° C. was determined to be 685 ppm. Based on the density of alumina known from literature this corresponds to a thickness of 0.5 nm.

II. Electrolyte Compositions

The electrolyte compositions were prepared by dissolving 1.0 M $LiPF_6$ in a mixture of ethyl carbonate (EC, BASF) and diethyl carbonate (DEC, BASF). The additives vinylene carbonate (VC), bis(trimethylsilyl) phosphite (A1), and oligomeric silyl-H-phosphonate (A2) were added to the base electrolyte compositions as indicated in Table 1. "wt. %" refers to the total weight of the electrolyte composition. All solvents were dry (water content <3 ppm). All electrolyte compositions were prepared and stored in an Ar-filled glovebox having oxygen and water level below 1.0 ppm. Additive (A2) was prepared as described for additive M1 of the international patent application PCT/EP2018/084385, published as WO2019115541A1.

TABLE 1

| Electrolyte compositions (ELY) | | | | | |
|---|---|---|---|---|---|
| | | | Additives [wt. %] | | |
| | Solvents [wt. %] | | 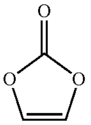 | 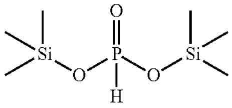 | 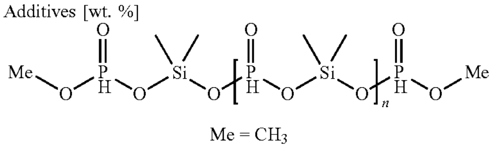 Me = $CH_3$ |
| ELY | EC | DEC | VC | A1 | A2 |
| 1 | 30 | 70 | 2 | — | — |
| 2 | 30 | 70 | 2 | 0.5 | — |
| 3 | 30 | 70 | 2 | — | 0.5 |

III. Electrochemical Cells

III.1 NCM622/Graphite Single Layer Pouch Cells

The positive electrodes for the electrochemical cycling experiments in pouch cells were prepared by coating on aluminum foil (thickness=20 μm) using a roll coater a slurry containing 94 wt. % cathode active material (94 wt. %), 1 wt. % active carbon (Super C65 L purchased form Timcal), 2 wt. % graphite (SFG6L from Timcal) and 3 wt. % polyvinylidene fluoride (PVdF) binders suspended in N-methyl-2-pyrrolidinone (NMP). Typically, all slurries were prepared on the basis of at least 30 g of cathode active material and the amount of NMP employed was such that the total solid content (CAM+SuperC65 L+SFG6L+PVdF) was ca. 65%. The electrode tapes were dried in a hot-air chamber and finally pressed using a roll pressor. Commercial graphite-coated tapes from Elexcel Corporation Ltd. were used as negative electrodes. The positive, negative composite electrodes and a polypropylene separator (Celgard) were used to manufacture single layer pouch cells. Thereafter, all cells were filled with electrolyte, as described in Table 1, in an argon-filled glove box having oxygen and water levels below 1.0 ppm and their electrochemical testing carried out in a Maccor 4000 battery-test system.

IV Evaluation of Electrochemical Cells

IV.1 Formation at 25° C.

Pouch cells prepared comprising a NCM622 cathode prepared according to III.1 and graphite anode were charged at a constant current of 0.1 C to a voltage of 4.25 V (CC charge). After degassing the cells, they were discharged at 0.1 C (3.0 V cut-off) (Cycle 1). Immediately after, the cells were charged at 25° C. at a constant current of 0.1 C to a voltage of 4.25 V (CC) and discharged at 0.1 C (3.0 V cut-off) (Cycle 2). Then, the cells were charged at a constant current of 0.5 C to a voltage of 4.25 V, charged at 4.25 V (CCCV) for either 60 minutes or until the current drops below 0.02 C and then the cells were discharged to a discharge voltage of 3 V at a constant current of 0.5 C (4 times, cycles 3 to 7). The cells were further cycled using the same charge conditions as in cycle 3 but using a discharge current of 1 C (2 times, cycles 7 to 8), 2 C (2 times, cycles 9 to 10) and 3 C (2 times, cycles 11 to 12). Finally, the cells were charged and discharged 10 times following the same procedure as that used in cycle 3.

IV.2 Evaluation of Cycling of Pouch Cell Comprising NCM622/Graphite Anode at 45° C. (Cycling) and 25° C. (Resistance Measurements) Using 4.25 V as Upper Cut-Off Voltage Once the cells were formed, as described above, they were charged at 25° C. a constant current of 0.2 C to a voltage of 4.25 V, charged at 4.25 V (CCCV) for either 60 minutes or until the current drops below 0.02 C and then the cells were discharged to a discharge voltage of 3 V at a constant current of 0.2 C. This procedure was repeated once and the discharge capacity was taken as the reference capacity for the next cycle. In this cycle, the cells were charge at a constant current of 0.2 C up to 75% of the reference capacity (75% state-of-charge=75% SoC) previously determined. Immediately after a 2.5 C current pulse was applied for 30 seconds for determining the cell resistance (cell resistance measurement). The cells were then discharged at a constant current of 0.2 C to 50% and 25% SoC and cell resistance measurements were repeated for each of these SoC values. The cells were then further discharged to 3.0 V at a constant current of 0.2 C.

Following these cell resistance measurements, the cells were transferred to a climate chamber and kept at a constant temperature of 45° C. After a 12-hour equilibration time, the cells were charged at a constant current of 1 C to a voltage of 4.25 V, charged at 4.25 V (CCCV) for either 60 minutes or until the current drops below 0.02 C and then the cells were discharged to a discharge voltage of 3 V at a constant current of 1 C (100 times).

The complete sequence described above (resistance measurements at various SoC values at 25° C. and 1 C cycling at 45° C.) was repeated at least 5 times. The results after 500 cycles at cycling at 1 C and 45° C. from the various examples are presented in Table 2 and expressed as percentages relative to the values obtained at the beginning of the procedure.

TABLE 2

Results obtained from the electrochemical cells

| Example No. | ELY No. | CAM No. | Remaining capacity at 45° C. after 500 cycles at 1 C [%] | Cell resistance increase at 25° C. at 50% SoC [%] |
|---|---|---|---|---|
| 1 (Comparative) | 1 | 1 | 87.5% | 293% |
| 2 (Comparative) | 1 | 2 | 90.7% | 164% |
| 3 (Comparative) | 2 | 1 | 92.2% | 146% |
| 4 (Inventive) | 2 | 2 | 92.3% | 126% |
| 5 (Comparative) | 3 | 1 | 90.8% | 124% |
| 6 (Inventive) | 3 | 2 | 91.6% | 108% |

As can be seen from the comparison of the examples the combination of a cathode active material coated with an oxide layer with an electrolyte composition containing a silyl ester phosphonate compound of formula (I) or containing a structure according to formula (II) yields an electrochemical cell showing a good capacity retention but a further lowered increase of the cell resistance after long term cycling at elevated temperatures.

What is claimed is:

1. An electrochemical cell, comprising (A) an anode comprising an anode active material;

(B) a cathode comprising at least one selected from the group consisting of:

(a) a particulate cathode active material comprising mixed lithium transition metal oxide comprising Mn and at least a second transition metal, (b) a particulate cathode active material comprising lithium intercalating mixed oxide comprising Ni and Al and a second transition metal, and (c) a particulate cathode active material comprising a lithium metal phosphate, an outer surface of the particulate cathode active material of (a), (b), and (c) being at least partially coated with an oxide comprising a transition metal, lanthanide, and/or a metal or half metal of groups 2, 13, and/or 14 of the periodic table;

(C) an electrolyte composition comprising:

(i) an aprotic organic solvent;

(ii) a lithium ion containing conducting salt; and (iii) a silyl ester phosphonate of formula (I), or a silyl ester phosphonate compound containing the structure of formula (II), or an oligomeric silyl ester phosphonate of formula (IX):

(I)

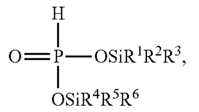

-continued (II)

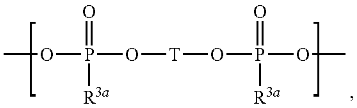, (IX)

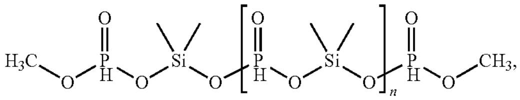, wherein in formula (I) $R^1$, $R^2$, $R^3$, $R^4$, $R^5$, and $R^6$ are independently H, F, $R^7$, $OR^7$, or OSi $(R^8)_3$, $R^7$ is $C_1$-$C_6$ alkyl, $C_2$-$C_6$ alkenyl, $C_2$-$C_6$ alkynyl, $C_5$-$C_7$ (hetero)aryl, or $C_6$-$C_{13}$ (hetero)aralkyl, optionally substituted by one or more $OSi(CH_3)_3$ and/or F, $R^8$ is independently H, F, $R^7$ or $OR^7$, or wherein $R^1$ and $R^4$ of Formula (I) are combined and jointly O, $CR^9R^{10}$ or $NR^{11}$ to form a 6-membered cycle ring with the Si—O—P—O—Si group in Formula (I), $R^9$ and $R^{10}$ are independently H, F, $R^7$, $OR^7$, or $OSiR^8{}_3$, $R^{11}$ is H or $R^7$, and wherein in formula (II) T is

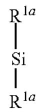 or 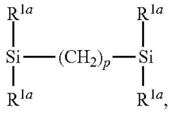, p is an integer in a range of from 1 to 6, one or more H of $(CH_2)_p$ are optionally replaced by $C_1$-$C_4$ alkyl;

$R^{1a}$ is independently H, F, Cl, $R^{4a}$, $OR^{4a}$, $OSi(R^{5a})_3$, $OSi(OR^{4a})_3$, or $OP(O)(OR^{4a})R^{5a}$, $R^{4a}$ is independently $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, or $C_6$-$C_{13}$ (hetero)aralkyl, optionally substituted by one or more CN and/or F, wherein one or more $CH_2$-groups of the alkyl, alkenyl, and alkynyl not directly bound to the Si-atom or the O-atom are optionally replaced by O, $R^{3a}$ and $R^{5a}$ are independently H, F, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, or $C_6$-$C_{13}$ (hetero)aralkyl, optionally substituted by one or more CN and/or F, wherein one or more $CH_2$-groups of the alkyl, alkenyl, and alkynyl not directly bound to the P-atom optionally replaced by O, and wherein in formula (IX) n is an integer from 1 to greater than 1;

wherein the electrolyte composition (C) comprises 0.01 to 30 wt % of the silyl ester phosphonate of formula (I) or formula (IX) or silyl ester phosphonate compound containing the structure of formula (II), based on total weight of the electrolyte composition (C).

2. The cell of claim 1, wherein the oxide forming the coating on the particulate material comprises scandium oxide, yttria, titania, zirconia, vanadium oxide, niobium oxide, tantalum oxide, molybdenum oxide, zinc oxide, cobalt oxide, lanthanum oxide, ceria, praseodymium oxide, neodymium oxide, samarium oxide, gadolinium oxide, calcium oxide, strontium oxide, barium oxide, boron oxide, aluminum oxyhydroxide, alumina, gallium oxide silicon oxide, germanium oxide, and/or tin oxide.

3. The cell of claim 1, wherein the particulate cathode active material is at least partially coated with an oxide comprising aluminum oxyhydroxide, alumina, zirconia, titania, and/or cobalt oxide.

4. The cell of claim 1, wherein the particulate cathode active material comprises the mixed lithium transition metal oxide comprising Mn and at least a second transition metal, with a layered structure of formula (VI)

$$Li_{1+e}(Ni_aCo_bMn_cM_d)_{1-e}O_2 \quad (VI),$$

wherein a is in a range of from 0.05 to less than 1, b is in a range of from 0 to 0.35, c is in a range of from 0.01 to 0.9, d is in a range of from 0 to 0.2, e is in a range of from 0 to 0.3, a+b+c+d=1, and M is a metal or half metal comprising Na, K, B, Al, Mg, Ca, Cr, V, Mo, Ti, Fe, W, Nb, Zr, and/or Zn.

5. The cell of claim 4, wherein the particulate cathode active material comprises the mixed lithium transition metal oxide comprising Mn and at least a second transition metal, with layered structure of formula (VI.3)

$$Li_{1+e}[(Ni_{a1}Co_{b1}Mn_{c1})_{1-d1}M_{d1}]_{1-e}O_2 \quad (VI.3),$$

wherein a1 is in a range of from 0.6 to 0.95, b1 is in a range of from 0.025 to 0.2, c1 is in a range of from 0.025 to 0.2, d1 is in a range of from 0 to 0.1, and e is in a range of from 0 to 0.2.

6. The cell of claim 1, wherein, in the silyl ester phosphonate of formula (II), $R^{1a}$ is independently H, F, Cl, $C_1$-$C_{10}$ alkyl, or $OC_1$-$C_{10}$ alkyl, the alkyl being optionally substituted by one or more CN and/or F, and one or more $CH_2$-groups of the alkyl not directly bound to the Si-atom or O-atom optionally being replaced by O, and $R^{3a}$ is independently H or $C_1$-$C_{10}$ alkyl, optionally substituted by one or more F and/or CN, and one or more $CH_2$-groups of the alkyl not directly bound to the P-atom optionally being replaced by O.

7. The cell of claim 1, wherein the silyl ester phosphonate comprises (II.1)

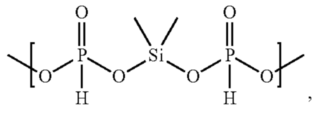, (II.2)

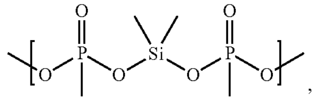, (II.3)

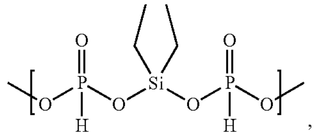,

-continued (II.4)

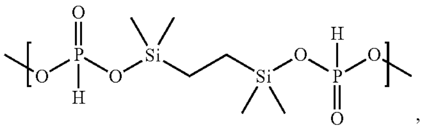

, and/or (II.6)

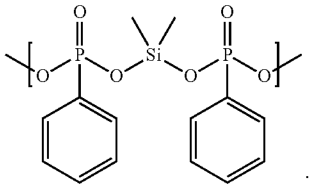

.

8. The cell of claim 7, where the silyl ester phosphonate comprises (II.1)

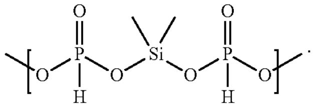

9. The cell of claim 7, wherein the silyl ester phosphonate comprises (II.2)

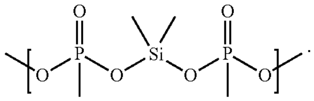

10. The cell of claim 1, wherein the electrolyte composition (C) comprises the silyl ester phosphonate of formula (I), wherein $R^1$, $R^2$, $R^3$, $R^4$, $R^5$, and $R^6$ are independently $C_1$-$C_4$ alkyl.

11. The cell of claim 1, wherein the electrolyte composition (C) comprises the silyl ester phosphonate of formula (I) comprising bis(trimethylsilyl) phosphite.

12. The cell of claim 1, wherein the aprotic organic solvent (i) comprises, optionally fluorinated, an organic carbonate, ether, ketal, orthocarboxylic acid ester, carboxylic acid ester, sulfone, nitrile, and/or a phosphate.

13. The cell of claim 1, wherein the aprotic organic solvent (i) comprises, optionally fluorinated, an ether and/or organic carbonate.

14. The cell of claim 1, wherein the electrolyte composition (C) further comprises an additive (iv) selected from the group consisting of an anode film forming additive, flame retardant, overcharging additive, wetting agent, HF and/or $H_2O$ scavenger, stabilizer for $LiPF_6$ salt, ionic solvation enhancer, corrosion inhibitor, and gelling agent, wherein additive (iv) is present at between 0.005 wt % to 25 wt % based on the total weight of electrolyte composition (C).

15. The cell of claim 1, wherein anode active material comprises lithium metal, a lithium metal alloy, a carbonaceous material, and/or a material comprising lithium ion intercalating Ti and/or Si oxide.

16. The cell of claim 15, wherein the anode active material further comprises silicon.

17. An electrochemical cell, comprising (A) an anode comprising an anode active material;

(B) a cathode comprising at least one selected from the group consisting of:

(a) a particulate cathode active material comprising mixed lithium transition metal oxide comprising Mn and a second transition metal, (b) a particulate cathode active material comprising lithium intercalating mixed oxide comprising Ni and Al and a second transition metal, and (c) a particulate cathode active material comprising a lithium metal phosphate, an outer surface of the particulate cathode active material of (a), (b), and (c) being at least partially coated with an oxide comprising a transition metal, lanthanide, and/or a metal or half metal of groups 2, 13, and/or 14 of the periodic table;

(C) an electrolyte composition comprising:

(i) an aprotic organic solvent;

(ii) a lithium ion containing conducting salt; and (iii) an oligomeric silyl ester phosphonate of formula (IX)

(IX)

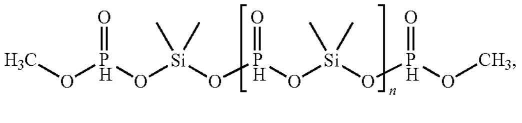

wherein n is an integer from 1 to greater than 1, and wherein the electrolyte composition (C) comprises 0.01 to 30 wt % of the oligomeric silyl ester phosphonate of formula (IX), based on total weight of electrolyte composition (C).

18. An electrochemical cell, comprising (A) an anode comprising an anode active material;

(B) a cathode comprising at least one selected from the group consisting of:

(a) a particulate cathode active material comprising mixed lithium transition metal oxide comprising Mn and a second transition metal, (b) a particulate cathode active material comprising lithium intercalating mixed oxide comprising Ni and Al and a second transition metal, and (c) a particulate cathode active material comprising a lithium metal phosphate, an outer surface of the particulate cathode active material of (a), (b), and (c) being at least partially coated with an oxide comprising a transition metal, lanthanide, and/or a metal or half metal of groups 2, 13, and/or 14 of the periodic table;

(C) an electrolyte composition comprising:

(i) an aprotic organic solvent;

(ii) a lithium ion containing conducting salt; and (iii) a silyl ester phosphonate compound containing the structure of formula (II):

(II)

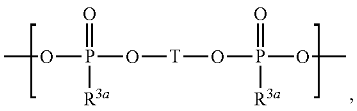

, wherein

T is

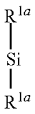

or

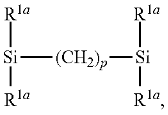

, p is an integer in a range of from 1 to 6, one or more H of $(CH_2)_p$ are optionally replaced by $C_1$-$C_4$ alkyl;

$R^{1a}$ is independently H, F, Cl, $R^{4a}$, $OR^{4a}$, $OSi(R^{5a})_3$, $OSi(OR^{4a})_3$, or $OP(O)(OR^{4a})R^{5a}$, $R^{4a}$ is independently $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, or $C_6$-$C_{13}$ (hetero)aralkyl, optionally substituted by one or more CN and/or F, wherein one or more $CH_2$-groups of the alkyl, alkenyl, and alkynyl not directly bound to the Si-atom or the O-atom are optionally replaced by O, $R^{3a}$ and $R^{5a}$ are independently H, F, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, or $C_6$-$C_{13}$ (hetero)aralkyl, optionally substituted by one or more CN and/or F, wherein one or more $CH_2$-groups of the alkyl, alkenyl, and alkynyl not directly bound to the P-atom optionally replaced by O; and wherein the electrolyte composition (C) comprises 0.01 to 30 wt % of the silyl ester phosphonate compound containing the structure of formula (II), based on total weight of the electrolyte composition (C).

* * * * *